US008059865B2

(12) United States Patent
Deng et al.

(10) Patent No.: US 8,059,865 B2
(45) Date of Patent: Nov. 15, 2011

(54) METHODS AND APPARATUS TO SPECIFY REGIONS OF INTEREST IN VIDEO FRAMES

(75) Inventors: Kevin Keqiang Deng, Safety Harbor, FL (US); Barry Greenberg, Weston, CT (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 709 days.

(21) Appl. No.: 12/239,425

(22) Filed: Sep. 26, 2008

(65) Prior Publication Data

US 2009/0123069 A1 May 14, 2009

Related U.S. Application Data

(60) Provisional application No. 60/986,723, filed on Nov. 9, 2007.

(51) Int. Cl.
*G06K 9/00* (2006.01)
*G06K 9/34* (2006.01)
*H04N 7/18* (2006.01)
*H04N 5/225* (2006.01)

(52) U.S. Cl. ......... 382/103; 382/173; 348/157; 348/169

(58) Field of Classification Search ............... 382/100, 382/103, 141, 173, 180–181, 188, 196, 199, 382/204, 224–227, 232, 236, 275–276, 284, 382/287, 291, 293–295, 305; 348/61, 135, 348/157, 164, 169, 170–172, 578, 589, 700, 348/722; 345/418–421, 441–442; 702/92, 702/94

See application file for complete search history.

(56) References Cited

U.S. PATENT DOCUMENTS

| 5,319,382 A | 6/1994 | Fitzpatrick et al. |
| 5,767,922 A | 6/1998 | Zabih et al. |
| 5,819,004 A | 10/1998 | Azadegan et al. |
| 5,892,837 A | 4/1999 | Luo et al. |

(Continued)

FOREIGN PATENT DOCUMENTS

EP     1449355     8/2004

(Continued)

OTHER PUBLICATIONS

United Kingdom Intellectual Property Office, "Search Report and Examination Opinion," issued in connection with United Kingdom Patent Application No. GB0820392.9, on Mar. 6, 2009 (5 pages).

(Continued)

*Primary Examiner* — Samir Ahmed
*Assistant Examiner* — Mehdi Rashidian
(74) *Attorney, Agent, or Firm* — Hanley, Flight & Zimmerman, LLC

(57) ABSTRACT

Methods and apparatus to specify regions of interest in video frames are disclosed. An example disclosed method comprises determining an initial template region to represent a region of interest whose location is based on a first point selected in a graphical presentation, determining a first modification to perform on the initial template region in response to a second point selected in the graphical presentation, detecting the second selected point in the graphical presentation, and reshaping the initial template region toward the second selected point, the reshaping corresponding to the first modification, the reshaping being performed in response to detecting the second selected point without also requiring the user to select any point substantially on the boundary defining the initial template region to initiate the reshaping.

20 Claims, 14 Drawing Sheets

U.S. PATENT DOCUMENTS

| | | | |
|---|---|---|---|
| 6,496,228 B1 | 12/2002 | McGee et al. | |
| 6,570,587 B1 | 5/2003 | Efrat et al. | |
| 6,937,766 B1 | 8/2005 | Wilf et al. | |
| 6,968,004 B1 | 11/2005 | Hori et al. | |
| 6,982,710 B2 * | 1/2006 | Salomie | 345/420 |
| 7,020,336 B2 | 3/2006 | Cohen-Solal et al. | |
| 7,027,659 B1 | 4/2006 | Thomas | |
| 7,130,467 B1 | 10/2006 | Bronder et al. | |
| 7,474,759 B2 * | 1/2009 | Sternberg et al. | 382/100 |
| 7,538,764 B2 * | 5/2009 | Salomie | 345/420 |
| 7,760,969 B2 * | 7/2010 | Silverbrook et al. | 382/313 |
| 2002/0069218 A1 | 6/2002 | Sull et al. | |
| 2003/0052875 A1 * | 3/2003 | Salomie | 345/419 |
| 2003/0056219 A1 | 3/2003 | Reichardt et al. | |
| 2003/0110078 A1 | 6/2003 | Chang et al. | |
| 2004/0015400 A1 | 1/2004 | Whymark | |
| 2004/0123314 A1 | 6/2004 | Bova | |
| 2005/0257151 A1 | 11/2005 | Wu | |
| 2006/0044389 A1 | 3/2006 | Chai et al. | |
| 2006/0062455 A1 | 3/2006 | Chiu et al. | |
| 2006/0174261 A1 | 8/2006 | Cline, Jr. et al. | |
| 2006/0238445 A1 | 10/2006 | Wang et al. | |
| 2006/0290695 A1 * | 12/2006 | Salomie | 345/420 |
| 2007/0076957 A1 | 4/2007 | Wang et al. | |
| 2007/0086669 A1 | 4/2007 | Berger et al. | |
| 2007/0118910 A1 | 5/2007 | Taylor | |
| 2007/0124764 A1 | 5/2007 | Morris | |
| 2007/0127774 A1 | 6/2007 | Zhang et al. | |
| 2007/0276841 A1 | 11/2007 | Rhoads et al. | |
| 2007/0294720 A1 | 12/2007 | Cohen et al. | |
| 2008/0019661 A1 | 1/2008 | Obrador et al. | |
| 2008/0028422 A1 | 1/2008 | Cohen et al. | |
| 2008/0077954 A1 | 3/2008 | Cohen et al. | |
| 2010/0004977 A1 * | 1/2010 | Marci et al. | 705/10 |

FOREIGN PATENT DOCUMENTS

| | | |
|---|---|---|
| GB | 2411786 | 9/2005 |

OTHER PUBLICATIONS

Tilton et al., "Interactive Analysis of Hierarchical Image Segmentation," IEEE, year 2000, 3 pages.
Barret et al., "Intelligent Segmentation Tools," IEEE, year 2002, 4 pages.
J.P. Lewis, "Fast Normalized Cross-Correlation," expanded version of a paper from Vision interface, year 1995, 7 pages.
Yang et al., "A Novel Approach for License Plate Character Segmentation," IEEE, year 2006, 6 pages.
Yang, "A Robust Character Segmentation Approach for License Plate," IEEE, year 2007, 5 pages.
Tilton, "Recursive Hierarchical Image Segmentation," Presentation at NASA Advanced Technology Workshop, Jul. 17-18, 2001, 26 pages.
WIKIPEDIA, "Region Growing," wikipedia website, year 2008, 5 pages.
WIKIPEDIA, "Segmentation (image processing)," wikipedia website, year 2008, 5 pages.
Mancas et al., "Segmentation Using a Region Growing Thresholding," http://tcts.fpms.ac.be/publications/papers/2005/spieEI05_mmbgbm.pdf, year 2005, 11 pages.
Deng, U.S. Appl. No. 12/239,412, Sep. 26, 2008, 91 pages.

* cited by examiner

EXAMPLES OF EXCLUDED SCENES

KEY FRAME OF FIELD SCENE

KEY FRAME OF A SHORT DURATION SCENE

KEY FRAME OF AN AUDIENCE SCENE

KEY FRAME OF A COMMERCIAL

EXAMPLE SCENES OF NO INTEREST

KEY FRAME OF SCENE OF NO INTEREST MARKED BY USER

KEY FRAME IDENTIFIED AS SCENE OF NO INTEREST

EXAMPLES REPEATED SCENES OF INTEREST

EXAMPLE REPEATED SCENES OF CHANGED INTEREST

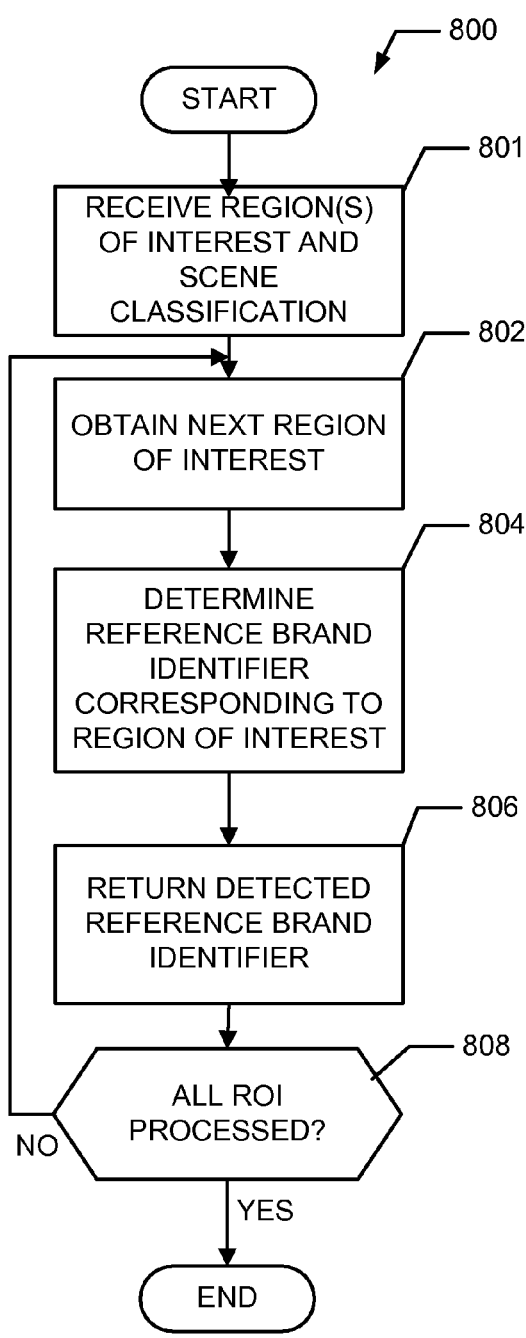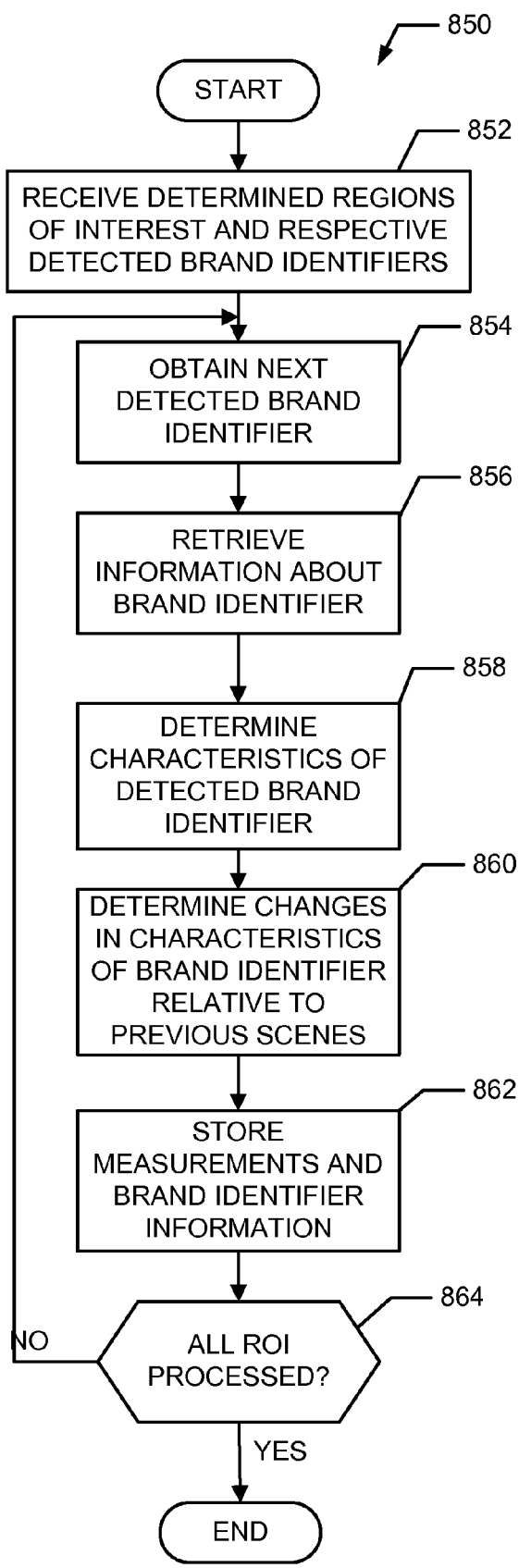
FIG. 8A
FIG. 8B

METHODS AND APPARATUS TO SPECIFY REGIONS OF INTEREST IN VIDEO FRAMES

RELATED APPLICATION(S)

This patent claims priority from U.S. Provisional Application Ser. No. 60/986,723, entitled "Methods and Apparatus to Measure Brand Exposure in Media Streams" and filed on Nov. 9, 2007. U.S. Provisional Application Ser. No. 60/986,723 is hereby incorporated by reference in its entirety.

FIELD OF THE DISCLOSURE

This disclosure relates generally to video frame processing, and, more particularly, to methods and apparatus to specify regions of interest in video frames.

BACKGROUND

As used herein, a "broadcast" refers to any sort of electronic transmission of any sort of media signal(s) from a source to one or more receiving devices of any kind. Thus, a "broadcast" may be a cable broadcast, a satellite broadcast, a terrestrial broadcast, a traditional free television broadcast, a radio broadcast, and/or an internet broadcast, and a "broadcaster" may be any entity that transmits signals for reception by a plurality of receiving devices. The signals may include media content (also referred to herein as "content" or "programs"), and/or commercials (also referred to herein as "advertisements"). An "advertiser" is any entity that provides an advertisement for broadcast. Traditionally, advertisers have paid broadcasters to interleave commercial advertisements with broadcast content (e.g., in a serial "content-commercial-content-commercial" format) such that, to view an entire program of interest, the audience is expected to view the interleaved commercials. This approach enables broadcasters to supply free programming to the audience while collecting fees for the programming from sponsoring advertisers.

To facilitate this sponsorship model, companies that rely on broadcast video and/or audio programs for revenue, such as advertisers, broadcasters and content providers, wish to know the size and demographic composition of the audience(s) that consume program(s). Merchants (e.g., manufacturers, wholesales and/or retailers) also want to know this information so they can target their advertisements to the populations most likely to purchase their products. Audience measurement companies have addressed this need by, for example, identifying the demographic composition of a set of statistically selected households and/or individuals (i.e., panelists) and the program consumption habits of the member(s) of the panel. For example, audience measurement companies may collect viewing data on a selected household by monitoring the content displayed on that household's television(s) and by identifying which household member(s) are present in the room when that content is displayed. An analogous technique is applied in the radio measurement context.

Gathering this audience measurement data has become more difficult as the diversity of broadcast systems has increased. For example, while it was once the case that television broadcasts were almost entirely terrestrial based, radio frequency broadcast systems (i.e., traditional free television), cable and satellite broadcast systems have now become commonplace. Further, these cable and/or satellite based broadcast systems often require the use of a dedicated receiving device such as a set top box (STB) or an integrated receiver decoder (IRD) to tune, decode, and/or display broadcast programs. To complicate matters further, some of these receiving devices for alternative broadcast systems as well as other receiving devices such as local media playback devices (e.g., video cassette recorders, digital video recorders, and/or personal video recorders) have made time shifted viewing of broadcast and other programs possible.

This ability to record and playback programming (i.e., time-shifting) has raised concerns in the advertising industry that consumers employing such time shifting technology will skip or otherwise fast forward through commercials when viewing recorded programs, thereby undermining the effectiveness of the traditional interleaved advertising model. To address this issue, rather than, or in addition to, interleaving commercials with content, merchants and advertisers have begun paying content creators a fee to place their product(s) within the content itself. For example, a manufacturer of a product (e.g., sunglasses) might pay a content creator a fee to have their product appear in a broadcast program (e.g., to have their sunglasses worn by an actor in the program) and/or to have their product mentioned by name during the program. It will be appreciated that the sunglasses example is merely illustrative and any other product or service of interest could be integrated into the programming in any desired fashion (e.g., if the product were a soft drink, an advertiser may pay a fee to have a cast member drink from a can displaying the logo of the soft drink).

Along similar lines, advertisers have often paid to place advertisements such as billboards, signs, etc. in locations from which broadcasting is likely to occur such that their advertisements appear in broadcast content. Common examples of this approach are the billboards and other signs positioned throughout arenas used to host sporting events, concerts, political events, etc. Thus, when, for example, a baseball game is broadcast, the signs along the perimeter of the baseball field (e.g., "Buy Sunshine Brand Sunglasses") are likewise broadcast as incidental background to the sporting event.

Due to the placement of the example sunglasses in the program and/or due to the presence of the example advertisement signage at the location of the broadcast event, the advertisement for the sunglasses and/or the advertisement signage (collectively and/or individually referred to herein as "embedded advertisement") is embedded in the broadcast content, rather than in a commercial interleaved with the content. Consequently, it is not possible for an audience member to fast forward or skip past the embedded advertisement without also fast forwarding or skipping past a portion of the program in which the advertisement is embedded. As a result, it is believed that audience members are less likely to skip the advertisement and, conversely, that audience members are more likely to view the advertisement than in the traditional interleaved content-commercial(s)-content-commercial(s) approach to broadcast advertising.

The advertising approach of embedding a product in content is referred to herein as "intentional product placement," and products placed by intentional product placement are referred to herein as "intentionally placed products." It will be appreciated that content may include intentionally placed products (i.e., products that are used as props in the content in exchange for a fee from an advertiser and/or merchant) and unintentionally placed products. As used herein, "unintentionally placed products" are products that are used as props in content by choice of the content creator without payment from an advertiser or merchant. Thus, an unintentionally placed product used as a prop is effectively receiving free advertisement, but may have been included for the purpose of, for example, story telling and not for the purpose of advertising.

Similarly, the advertising approach of locating a sign, billboard or other display advertisement at a location where it is expected to be included in a broadcast program such as a sporting event is referred to herein as "intentional display placement," and advertising displays of any type which are placed by intentional display placement are referred to herein as "intentionally placed displays." It will be appreciated that content may include intentionally placed displays (i.e., displays that were placed to be captured in a broadcast) and unintentionally placed displays (i.e., displays that are not intended by the advertiser to be captured in content, but, due to activity by a content creator, they are included incidentally in the content through, for example, filming a movie or television show in Times Square, filming a live news story on a city street adjacent a billboard or store front sign, etc.). Additionally, as used herein "intentionally placed advertisement" generically refers to any intentionally placed product and/or any intentionally placed display. Analogously, "unintentionally placed advertisement" generically refers to any unintentionally placed product and/or any unintentionally placed display.

The brand information (e.g., such as manufacturer name, distributor name, provider name, product/service name, catch phrase, etc.), as well as the visual appearance (e.g., such as screen size, screen location, occlusion, image quality, venue location, whether the appearance is static or changing (e.g., animated), whether the appearance is real or a virtual overlay, etc.) and/or audible sound of the same included in an embedded advertisement (e.g., such as an intentional or unintentional product placement, display placement or advertising placement) is referred to herein as a "brand identifier" or, equivalently, a "logo" for the associated product and/service. For example, in the case of an intentional display placement of a sign proclaiming "Buy Sunshine Brand Sunglasses" placed along the perimeter of a baseball field, the words and general appearance of the phrase "Buy Sunshine Brand Sunglasses" comprise the brand identifier (e.g., logo) corresponding to this intentional display placement.

BRIEF DESCRIPTION OF THE DRAWINGS

FIGS. 8A-8B are flowcharts representative of example machine accessible instructions that may be executed to implement the example brand recognizer of FIG. 2.

DETAILED DESCRIPTION

The terms "brand exposure" and "exposures to brand identifiers" as used herein refer to the presentation of one or more brand identifiers in media content delivered by a media content stream, thereby providing an opportunity for an observer of the media content to become exposed to the brand identifier(s) (e.g., logo(s)). As used herein, a brand exposure does not require that the observer actually observe the brand identifier in the media content, but instead indicates that the observer had an opportunity to observe the brand identifier, regardless of whether the observer actually did so. Brand exposures may be tabulated and/or recorded to determine the effectiveness of intentional or unintentional product placement, display placement or advertising placement.

In the description that follows, a broadcast of a baseball game is used as an example of a media stream that may be processed according to the methods and/or apparatus described herein to determine brand exposure. It will be appreciated that the example baseball game broadcast is merely illustrative and the methods and apparatus disclosed herein are readily applicable to processing media streams to determine brand exposure associated with any type of media content. For example, the media content may correspond to any type of sporting event, including a baseball game, as well as any television program, movie, streaming video content, video game presentation, etc.

Figure 1:
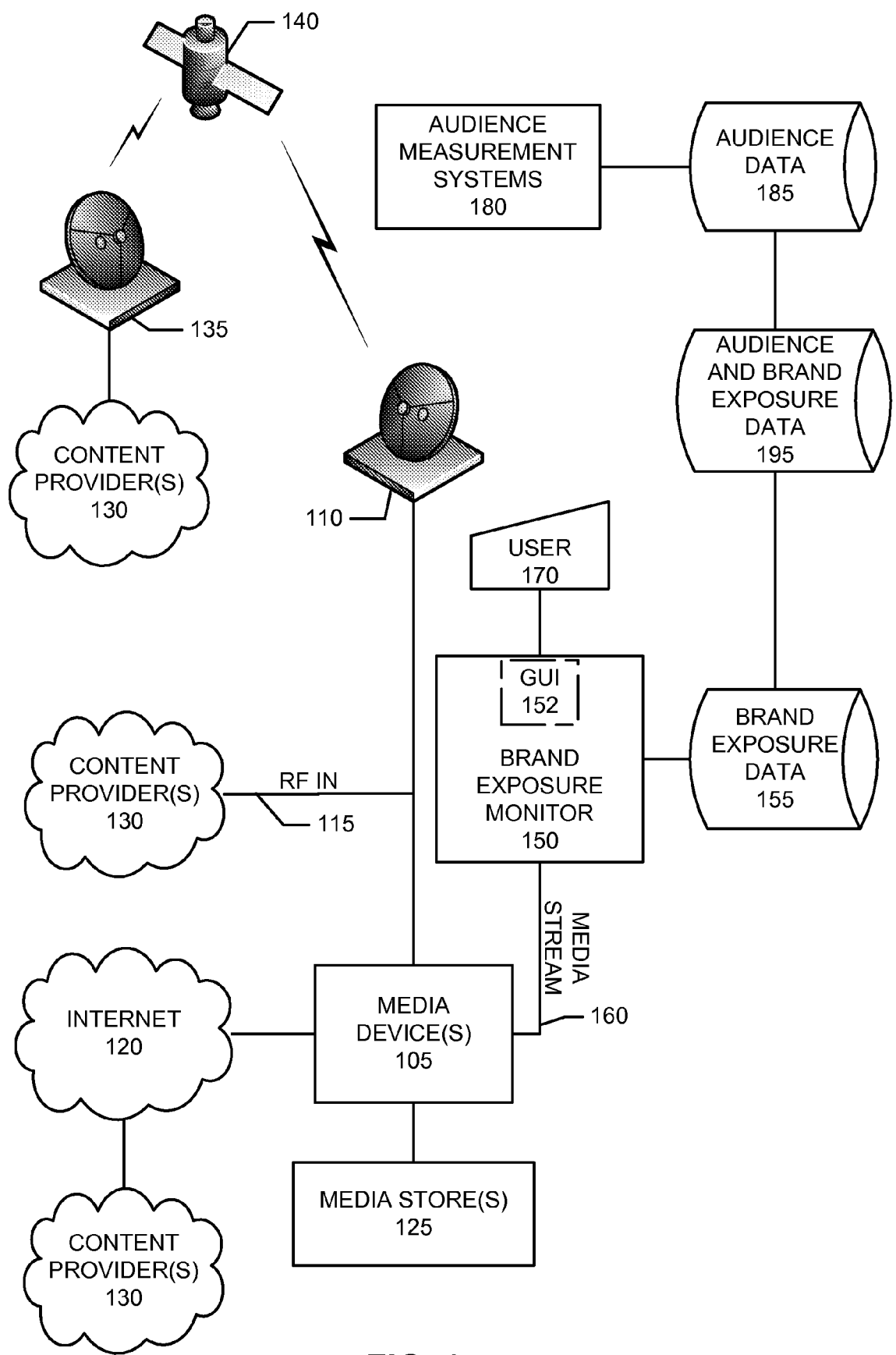
FIG. 1 is a schematic illustration of an example system to measure brand exposure in media streams.

FIG. 1 is a schematic illustration of an example system to measure brand exposures in media streams. The example system of FIG. 1 utilizes one or more media measurement techniques, such as, for example, audio codes, audio signatures, video codes, video signatures, image codes, image signatures, etc., to identify brand exposures in presented media content (e.g., such as content currently being broadcast or previously recorded content) provided by one or more media streams. In an example implementation, image signatures corresponding to one or more portions of a media stream are compared with a database of reference image signatures that represent corresponding portions of reference media content to facilitate identification of one or more scenes broadcast in the media stream and/or one or more brand identifiers included in the broadcast scene(s).

To process (e.g., receive, play, view, record, decode, etc.) and present any number and/or type(s) of content, the example system of FIG. 1 includes any number and/or type(s) of media device(s) 105. The media device(s) 105 may be implemented by, for example, a set top box (STB), a digital video recorder (DVR), a video cassette recorder (VCR), a personal computer (PC), a game console, a television, a media player, etc., or any combination thereof. Example media content includes, but is not limited to, television (TV) programs, movies, videos, websites, commercials/advertisements, audio, games, etc. In the example system of FIG. 1, the example media device 105 receives content via any number and/or type(s) of sources such as, for example: a satellite receiver and/or antenna 110, a radio frequency (RF) input signal 115 corresponding to any number and/or type(s) of cable TV signal(s) and/or terrestrial broadcast(s), any number and/or type(s) of data communication networks such as the Internet 120, any number and/or type(s) of data and/or media store(s) 125 such as, for example, a hard disk drive (HDD), a VCR cassette, a digital versatile disc (DVD), a compact disc (CD), a flash memory device, etc. In the example system of FIG. 1, the media content (regardless of its source) may include for example, video data, audio data, image data, website data, etc.

To generate the content for processing and presentation by the example media device(s) 105, the example system of FIG. 1 includes any number and/or type(s) of content provider(s) 130 such as, for example, television stations, satellite broadcasters, movie studios, website providers, etc. In the illustrated example of FIG. 1, the content provider(s) 130 deliver and/or otherwise provide the content to the example media device 105 via any or all of a satellite broadcast using a satellite transmitter 135 and a satellite and/or satellite relay 140, a terrestrial broadcast received via the RF input signal 115, a cable TV broadcast received via the RF input signal 115, the Internet 120, and/or the media store(s) 125.

To measure brand exposure (i.e., exposures to brand identifiers) in media stream(s) processed and presented by the example media device(s) 105, the example system of FIG. 1 includes at least one brand exposure monitor, one of which is illustrated at reference number 150 of FIG. 1. The example brand exposure monitor 150 of FIG. 1 processes a media stream 160 output by the example media device 105 to identify at least one brand identifier being presented via the media device 105. In general, the example brand exposure monitor 150 operates to identify brand identifiers and report brand exposure(s) automatically using known or previously learned information when possible, and then defaults to requesting manual user input when such automatic identification is not possible. At a high-level, the example brand exposure monitor 150 achieves this combination of automatic and manual brand exposure processing by first dividing the media stream 160 into a group of successive detected scenes, each including a corresponding group of successive image frames. The example brand exposure monitor 150 then excludes any scenes known not to include any brand identifier information. Next, the example brand exposure monitor 150 compares each non-excluded detected scene to a library of reference scenes to determine whether brand exposure monitoring may be performed automatically. For example, automatic brand exposure monitoring is possible if the detected scene matches information stored in the reference library which corresponds to a repeated scene of interest or a known scene of no interest. However, if the detected scene does not match (or fully match) information in the reference library, automatic brand exposure monitoring is not possible and the example brand exposure monitor 150 resorts to manual user intervention to identify some or all of the brand identifier(s) included in the detected scene for brand exposure reporting.

Examining the operation of the example brand exposure monitor 150 of FIG. 1 in greater detail, the example brand exposure monitor 150 determines (e.g., collects, computes, extracts, detects, recognizes, etc.) content identification information (e.g., such as at least one audio code, audio signature, video code, video signature, image code, image signature, etc.) to divide the media stream 160 into a group of successive scenes. For example, the brand exposure monitor 150 may detect a scene of the media stream 160 as corresponding to a sequence of adjacent video frames (i.e., image frames) having substantially similar characteristics such as, for example, a sequence of frames corresponding to substantially the same camera parameters (e.g., angle, height, aperture, focus length, etc.) and having background that is statistically stationary (e.g., the background may have individual components that move, but the overall background on average appears relative stationary). The brand exposure monitor 150 of the illustrated example utilizes scene change detection to mark the beginning image frame and the ending image frame corresponding to a scene. In an example implementation, the brand exposure monitor 150 performs scene change detection by creating an image signature for each frame of the media stream 160 (possibly after subsampling) and then comparing the image signatures of a sequence of frames to determine when a scene change occurs. For example, the brand exposure monitor 150 may compare the image signature corresponding to the starting image of a scene to the image signatures for one or more successive image frames following the starting frame. If the image signature for the starting frame does not differ significantly from a successive frame's image signature, the successive frame is determined to be part of the same scene as the starting frame. However, if the image signatures are found to differ significantly, the successive frame that differs is determined to be the start of a new scene and becomes the first frame for that new scene. Using the example of a media stream 160 providing a broadcast of a baseball game, a scene change occurs when, for example, the video switches from a picture of a batter to a picture of the outfield after the batter successfully hits the ball.

Next, after the scene is detected, the brand exposure monitor 150 of the illustrated example determines at least one key frame and key image signature representative of the scene. For example, the key frame(s) and key image signature(s) for the scene may be chosen to be the frame and signature corresponding to the first frame in the scene, the last frame in the scene, the midpoint frame in the scene, etc. In another example, the key frame(s) and key image signature(s) may be determined to be an average and/or some other statistical combination of the frames and/or signatures corresponding to the detected scene.

To reduce processing requirements, the brand exposure monitor 150 may exclude a detected scene under circumstances where it is likely the scene will not contain any brand identifiers (e.g., logos). In an example implementation, the brand exposure monitor 150 is configured to use domain knowledge corresponding to the particular type of media content being processed to determine when a scene exhibits characteristics indicating that the scene will not contain any brand identifiers. For example, in the context of media content corresponding to the broadcast of a baseball game, a scene including a background depicting only the turf of the baseball field may be known not to contain any brand identifiers. In such a case, the brand exposure monitor 150 may exclude a scene from brand exposure monitoring if the scene exhibits characteristics of a scene depicting the turf of the baseball field (e.g., such as a scene having a majority of pixels that are predominantly greenish in color and distributed such that, for example, the top and bottom areas of the scene include regions of greenish pixels grouped together). If a detected scene is excluded, the brand exposure monitor 150 of the illustrated example reports the excluded scene and then continues processing to detect the next scene of the media stream 160.

Assuming that a detected scene is not excluded, the example brand exposure monitor 150 then compares the image signature for the detected scene with one or more databases (not shown) of reference signatures representative of previously learned and/or known scenes to determine whether the current detected scene is a known scene or a new scene. If the current scene matches a previously learned and/or known scene stored in the database(s), the brand exposure monitor 150 obtains status information for the scene from the database(s). If the status information indicates that the scene had been previously marked as a scene of no interest in the database(s) (e.g., such as a scene known not to include any brand identifiers (e.g., logos)), the scene is reported as a scene of no interest and may be included in the database(s) as learned information to be used to identify future scenes of no interest. For example, and as discussed in greater detail below, a scene may be marked as a scene of no interest if it is determined that no brand identifiers (e.g., logos) are visible in the scene. The brand exposure monitor 150 of the illustrated example then continues processing to detect the next scene of the media stream 160.

If, however, the current scene is indicated to be a scene of interest, the brand exposure monitor 150 then determines one or more expected regions of interest residing within the current scene that may contain a brand identifier (e.g., logo), as discussed in greater detail below. The brand exposure monitor 150 then verifies the expected region(s) of interest with one or more databases (not shown) storing information representative of reference (e.g., previously learned and/or known) brand identifiers (e.g., logos). If all of the expected region(s) of interest are verified to include corresponding expected brand identifier(s), the example brand exposure monitor 150 reports exposure to matching brand identifiers.

However, if the current scene does not match any reference (e.g., previously learned and/or known) scene, and/or at least one region of interest does not match one or more reference (e.g., previously learned and/or known) brand identifiers, the brand exposure monitor 150 initiates a graphical user interface (GUI) session at the GUI 152. The GUI 152 is configured to display the current scene and prompt the user 170 to provide an identification of the scene and/or the brand identifiers included in the region(s) of interest. For each brand identifier recognized automatically or via information input by the user 170 via the GUI 152, corresponding data and/or reports are stored in an example brand exposure database 155 for subsequent processing. After the scene and/or brand identifier(s) have been identified by the user 170 via the GUI 152, the current scene and/or brand identifier(s) are stored in their respective database(s). In this way, the current scene and/or brand identifier(s), along with any corresponding descriptive information, are learned by the brand exposure monitor 150 and can be used to detect future instances of the same scene and/or brand identifier(s) in the media stream 160 without further utilizing the output device and/or GUI 152. An example manner of implementing the example brand exposure monitor 150 of FIG. 1 is described below in connection with FIG. 2.

During scene and/or brand identifier recognition, the brand exposure monitor 150 may also present any corresponding audio content to the user 170 to further enable identification of any brand audio mention(s). Upon detection of an audio mention of a brand, the user 170 may so indicate the audio mention to the brand exposure monitor 150 by, for example, clicking on an icon on the GUI 152, inputting descriptive information for the brand identifier (e.g., logo), etc. Furthermore, key words from closed captioning, screen overlays, etc., may be captured and associated with detected audio mentions of the brand. Additionally or alternatively, audio, image and/or video codes inserted by content providers 130 to identify content may be used to identify brand identifiers. For example, an audio code for a segment of audio of the media stream 160 may be extracted and cross-referenced to a database of reference audio codes. Audio exposure of a detected brand identifier may also be stored in the example brand exposure database 155. The audio mentions stored in the example brand exposure database 155 may also contain data that links the audio mention(s) to scene(s) being broadcast. Additionally, the identified audio mentions may be added to reports and/or data regarding brand exposure generated from the example brand exposure database 155.

To record information (e.g., such as ratings information) regarding audience consumption of the media content provided by the media stream 160, the example system of FIG. 1 includes any number and/or type(s) of audience measurements systems, one of which is designated at reference numeral 180 in FIG. 1. The example audience measurement system 180 of FIG. 1 records and/or stores in an example audience database 185 information representative of persons, respondents, households, etc., consuming and/or exposed to the content provided and/or delivered by the content providers 130. The audience information and/or data stored in the example audience database 185 may be further combined with the brand exposure information/data recorded in the example brand exposure database 155 by the brand exposure monitor 150. In the illustrated example, the combined audience/brand exposure information/data is stored in an example audience and brand exposure database 195. The combination of audience information and/or data and brand based exposure measurement information 195 may be used, for example, to determine and/or estimate one or more statistical values representative of the number of persons and/or households exposed to one or more brand identifiers.

Figure 2:
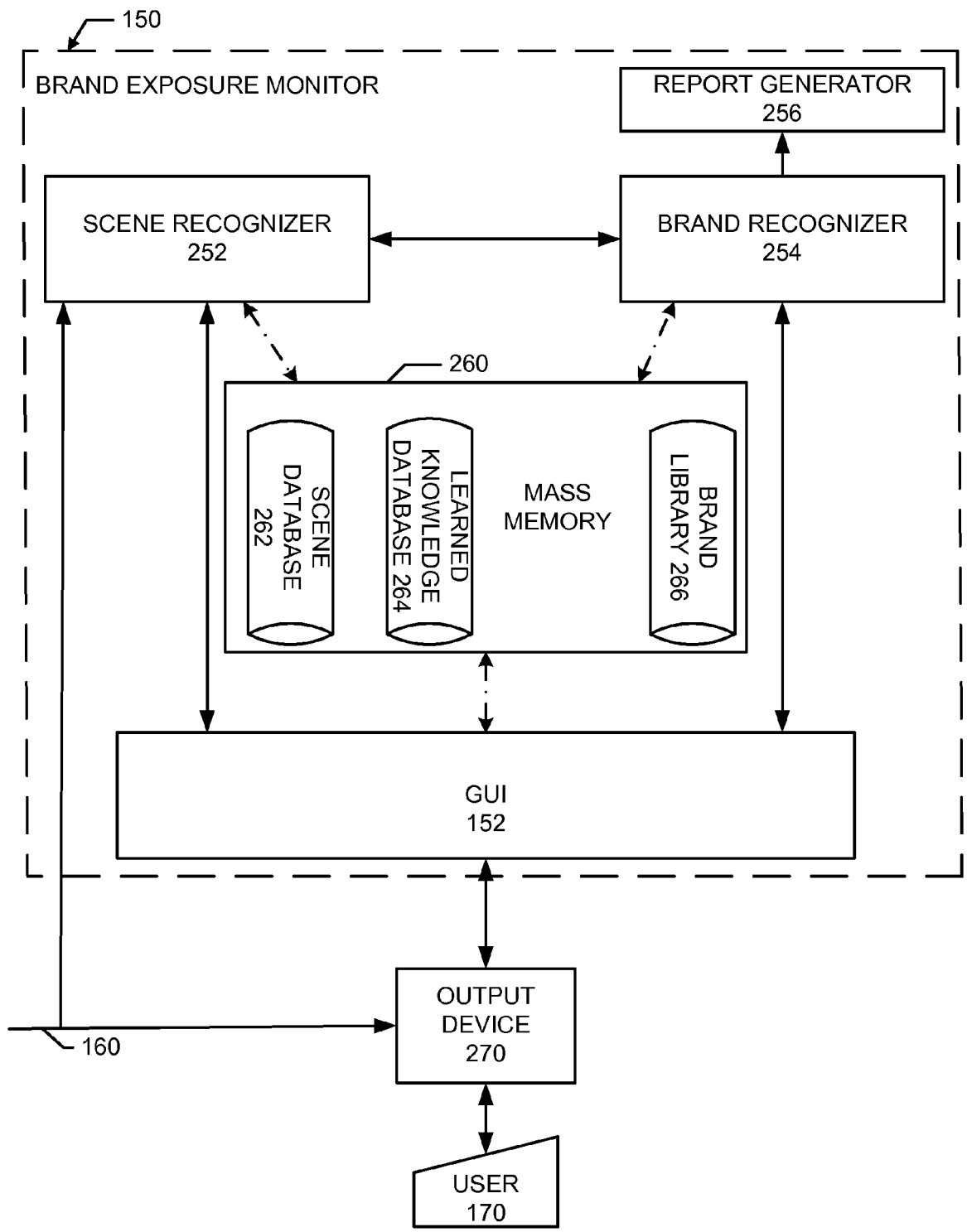
FIG. 2 illustrates an example manner of implementing the example brand exposure monitor of FIG. 1.

FIG. 2 illustrates an example manner of implementing the example brand exposure monitor 150 of FIG. 1. To process the media stream 160 of FIG. 1, the brand exposure monitor 150 of FIG. 2 includes a scene recognizer 252. The example scene recognizer 252 of FIG. 2 operates to detect scenes and create one or more image signatures for each identified scene included in the media stream 160. In an example implementation, the media stream 160 includes a video stream comprising a sequence of image frames having a certain frame rate (e.g., such as 30 frames per second). A scene corresponds to a sequence of adjacent image frames having substantially similar characteristics. For example, a scene corresponds to a sequence of images captured with similar camera parameters (e.g., angle, height, aperture, focus length) and having a background that is statistically stationary (e.g., the background may have individual components that move, but the overall background on average appears relatively stationary). To perform scene detection, the example scene recognizer 252 creates an image signature for each image frame (possibly after sub-sampling at a lower frame rate). The example scene recognizer then compares the image signatures within a sequence of frames to a current scene's key signature(s) to determine whether the image signatures are substantially similar or different. As discussed above, a current scene may be represented by one or more key frames (e.g., such as the first frame, etc.) with a corresponding one or more key signatures. If the image signatures for the sequence of frames are substantially similar to the key signature, the image frames are considered as corresponding to the current scene and at least one of the frames in the sequence (e.g., such as the starting frame, the midpoint frame, the most recent frame, etc.) is used as a key frame to represent the scene. The image signature corresponding to the key frame is then used as the image signature for the scene itself. If, however, a current image signature corresponding to a current image frame differs sufficiently from the key frames signature(s), the current image frame corresponding to the current image signature is determined to mark the start of a new scene of the media stream 160. Additionally, the most recent previous frame is determined to mark the end of the previous scene.

How image signatures are compared to determine the start and end frames of scenes of the media stream 160 depends on the characteristics of the particular image signature technique implemented by the scene recognizer 252. In an example implementation, the scene recognizer 252 creates a histogram of the luminance (e.g., Y) and chrominance (e.g., U & V) components of each image frame or one or more specified portions of each image. This image histogram becomes the image signature for the image frame. To compare the image signatures of two frames, the example scene recognizer 252 performs a bin-wise comparison of the image histograms for the two frames. The scene recognizer 252 then totals the differences for each histogram bin and compares the computed difference to one or more thresholds. The thresholds may be preset and/or programmable, and may be tailored to balance a trade-off between scene granularity vs. processing load requirements.

The scene recognizer 252 of the illustrated example may also implement scene exclusion to further reduce processing requirements. As discussed above, the example scene recognizer 252 may exclude a scene based on, for example, previously obtained domain knowledge concerning the media content carried by the example media stream 160. The domain knowledge, which may or may not be unique to the particular type of media content being processed, may be used to create a library of exclusion characteristics indicative of a scene that will not include any brand identifiers (e.g., logos). If scene exclusion is implemented, the example scene recognizer 252 may mark a detected scene for exclusion if it possesses some or all of the exclusion characteristics. For example, and as discussed above, in the context of media content corresponding to the broadcast of a baseball game, a scene characterized by a predominantly greenish background may be marked for exclusion because the scene corresponds to a camera shot depicting the turf of the baseball field. This is because, based on domain knowledge concerning broadcasted baseball games, it is known that camera shots of the baseball field's turf rarely, if ever, include any brand identifiers to be reported. As discussed above, the example scene recognizer 252 of the illustrated example reports any excluded scene and then continues processing to detect the next scene of the media stream 160. Alternatively, the example scene recognizer 252 could simply discard the excluded scene and continue processing to detect the next scene of the media stream 160. An example manner of implementing the example scene recognizer 252 of FIG. 2 is discussed below in connection with FIG. 3.

Assuming that the detected scene currently being processed (referred to as the "current scene") is not excluded, the example scene recognizer 252 begins classifying the scene into one of the following four categories: a repeated scene of interest, a repeated scene of changed interest, a new scene, or a scene of no interest. For example, a scene of no interest is a scene known or previously identified as including no visible brand identifiers (e.g., logos). A repeated scene of interest is a scene of interest known to include visible brand identifiers (e.g., logos) and in which all visible brand identifiers are already known and can be identified. A repeated scene of changed interest is a scene of interest known to include visible brand identifiers (e.g., logos) and in which some visible brand identifiers (e.g., logos) are already known and can be identified, but other visible brand identifiers are unknown and/or cannot be identified automatically. A new scene corresponds to an unknown scene and, therefore, it is unknown whether the scene includes visible brand identifiers (e.g., logos).

To determine whether the current scene is a scene of no interest or whether the scene is one of the other scenes of interest that may contain visible brand identifiers, the example scene recognizer 252 compares the image signature for the scene with one or more reference signatures. The reference signatures may correspond to previously known scene information stored in a scene database 262 and/or previously learned scene information stored in a learned knowledge database 264. If the current scene's image signature does not match any of the available reference signatures, the example scene recognizer 252 classifies the scene as a new scene. If the scene's image signature does match one or more of the available reference signatures, but information associated with the matched reference signature(s) and stored in the scene database 262 and/or learned knowledge database 264 indicates that the scene includes no visible brand identifiers, the example scene recognizer 252 classifies the scene as a scene of no interest. Otherwise, the scene will be a classified as either a repeated scene of interest or a repeated scene of changed interest by the example scene recognizer 252 as discussed below.

In an example implementation using the image histograms described above to represent image signatures, a first threshold (or first thresholds) could be used for scene detection, and a second threshold (or second thresholds) could be used for scene classification based on comparison with reference scenes. In such an implementation, the first threshold(s) would define a higher degree of similarity than the second threshold(s). In particular, while the first threshold(s) would define a degree of similarity in which there was little or no change (at least statistically) between image frames, the second threshold(s) would define a degree of similarity in which, for example, some portions of the compared frames could be relatively similar, whereas other portions could be different. For example, in the context of the broadcast baseball game example, a sequence of frames showing a first batter standing at home plate may meet the first threshold(s) such that all the frames in the sequence are determined to belong to the same scene. When a second batter is shown standing at home plate, a comparison of first frame showing the second batter with the frame(s) showing the first batter may not meet the first threshold(s), thereby identifying the start of a new scene containing the second batter. However, because the background behind home plate will be largely unchanging, a comparison of the first scene containing the first batter with the second scene containing the second batter may meet the second threshold(s), indicating that the two scenes should be classified as similar scenes. In this particular example, the scene containing the second batter would be considered a repeated scene relative to the scene containing the first batter.

The scene database 262 may be implemented using any data structure(s) and may be stored in any number and/or type(s) of memories and/or memory devices 260. The learned knowledge database 264 may be implemented using any data structure(s) and may be stored in any number and/or type(s) of memories and/or memory devices 260. For example, the scene database 262 and/or the learned knowledge database 264 may be implemented using bitmap files, a JPEG file repository, etc.

To determine whether the scene having a signature matching one or more reference signatures is a repeated scene of interest or a repeated scene of changed interest, the example scene recognizer 252 of FIG. 2 identifies one or more expected regions of interest included in the scene at issue based on stored information associated with reference scene(s) corresponding to the matched reference signature(s). An example brand recognizer 254 (also known as a logo detector 254) included in the example brand exposure monitor 150 then performs brand identifier recognition (also known as "logo detection") by comparing and verifying the expected region(s) of interest with information corresponding to one or more corresponding expected reference brand identifiers stored in the learned knowledge database 264 and/or a brand library 266. For example, the brand recognizer 254 may verify that the expected reference brand identifier(s) is/are indeed included in the expected region(s) of interest by comparing each expected region of interest in the scene's key frame with known brand identifier templates and/or templates stored in the example learned knowledge database 264 and/or a brand library 266. The brand library 266 may be implemented using any data structure(s) and may be stored in any number and/or type(s) of memories and/or memory devices 260. For example, the brand library 266 may store the information in a relational database, a list of signatures, a bitmap file, etc. Example techniques for brand identifier recognition (or logo detection) are discussed in greater detail below.

Next, for each verified region of interest, the example brand recognizer 254 initiates a tracker function to track the contents of the verified region of interest across all the actual image frames include in the current scene. For example, the tracker function may compare a particular region of interest in the current scene's key frame with corresponding region(s) of interest in each of the other frames in the current scene. If the tracker function verifies that the corresponding expected region(s) of interest match in all of the current scene's image frames, the example scene recognizer 252 classifies the scene as a repeated scene of interest. If, however, at least one region of interest in at least one of the current scene's image frames could not be verified with a corresponding expected reference brand identifier, the scene recognizer 252 classifies the scene as a repeated scene of changed interest. The processing of repeated scenes of changed interest is discussed in greater detail below. After classification of the scene, the scene recognizer 252 continues to detect and/or classify the next scene in the media stream 160.

To provide identification of unknown and/or unidentified brand identifiers included in new scenes and repeated scenes of changed interest, the example brand exposure monitor 150 of FIG. 1 includes the GUI 152. The example GUI 152, also illustrated in FIG. 2, displays information pertaining to the scene and prompts the user 170 to identify and/or confirm the identity of the scene and/or one or more potential brand identifiers included in one or more regions of interest. The example GUI 152 may be displayed via any type of output device 270, such as a television (TV), a computer screen, a monitor, etc., when a new scene or a repeated scene of changed interest is identified by the example scene recognizer 252. In an example implementation, when a scene is classified as a new scene or a repeated scene of changed interest, the example scene recognizer 252 stops (e.g., pauses) the media stream 160 of FIG. 1 and then the GUI 152 prompts the user 170 for identification of the scene and/or identification of one or more regions of interest and any brand identifier(s) included in the identified region(s) of interest. For example, the GUI 152 may display a blank field to accept a scene name and/or information regarding a brand identifier provided by the user 170, provide a pull down menu of potential scene names and/or brand identifiers, suggest a scene name and/or a brand identifier which may be accepted and/or overwritten by the user 170, etc. To create a pull down menu and/or an initial value to be considered by the user 170 to identify the scene and/or any brand identifiers included in any respective region(s) of interest of the scene, the GUI 152 may obtain data stored in the scene database 262, the learned knowledge database 264 and/or the brand library 266.

To detect the size and shape of one or more regions of interest included in a scene, the example GUI 152 of FIG. 2 receives manual input to facilitate generation and/or estimation of the location, boundaries and/or size of each region of interest. For example, the example GUI 152 could be implemented to allow the user 170 to mark a given region of interest by, for example, (a) clicking on one corner of the region of interest and dragging the cursor to the furthest corner, (b) placing the cursor on each corner of the region of interest and clicking while the cursor is at each of the corners, (c) clicking anywhere in the region of interest with the GUI 152 estimating the size and/or shape to calculate of the region of interest, etc.

Existing techniques for specifying and/or identifying regions of interest in video frames typically rely on manually marked regions of interest specified by a user. Many manual marking techniques require a user to carefully mark all vertices of a polygon bounding a desired region of interest, or otherwise carefully draw the edges of some other closed graphical shape bounding the region of interest. Such manual marking techniques can require fine motor control and hand-eye coordination, which can result in fatigue if the number of regions of interest to be specified is significant. Additionally, different user are likely to mark regions of interest differently using existing manual marking techniques, which can result in irreproducible, imprecise and/or inconsistent monitoring performance due to variability in the specification of regions of interest across the video frames associated with the broadcast content undergoing monitoring.

In a first example region of interest marking technique that may be implemented by the example GUI 152, the GUI 152 relies on manual marking of the perimeter of a region of interest. In this first example marking technique, the user 170 uses a mouse (or any other appropriate input device) to move a displayed cursor to each point marking the boundary of the desired region of interest. The user 170 marks each boundary point by clicking a mouse button. After all boundary points are marked, the example GUI 152 connects the marked points in the order in which they were marked, thereby forming a polygon (e.g., such as a rectangle) defining the region of interest. Any area outside the polygon is regarded as being outside the region of interest. As mentioned above, one potential drawback of this first example region of interest marking technique is that manually drawn polygons can be imprecise and inconsistent. This potential lack of consistency can be especially problematic when region(s) of interest for a first set of scenes are marked by one user 170, and region(s) of interest from some second set of scenes are marked by another user 170. For example, inconsistencies in the marking of regions of interest may adversely affect the accuracy or reliability of any matching algorithms/techniques relying on the marked regions of interest.

In a second example region of interest marking technique that may be implemented by the example GUI 152, the GUI 152 implements a more automatic and consistent approach to marking a desired region of interest in any type of graphical presentation. For example, this second example region of interest marking technique may be used to mark a desired region of interest in an image, such as corresponding to a video frame or still image. Additionally or alternatively, the second example region of interest marking technique may be used to mark a desired region of interest in a drawing, diagram, slide, poster, table, document, etc., created using, for example, any type of computer aided drawing and/or drafting application, word processing application, presentation creation application, etc. The foregoing example of graphical presentations are merely illustrative and are not meant to be limiting with respect to the type of graphical presentations for which the second example region of interest marking technique may be used to mark a desired region of interest.

Figure 10:
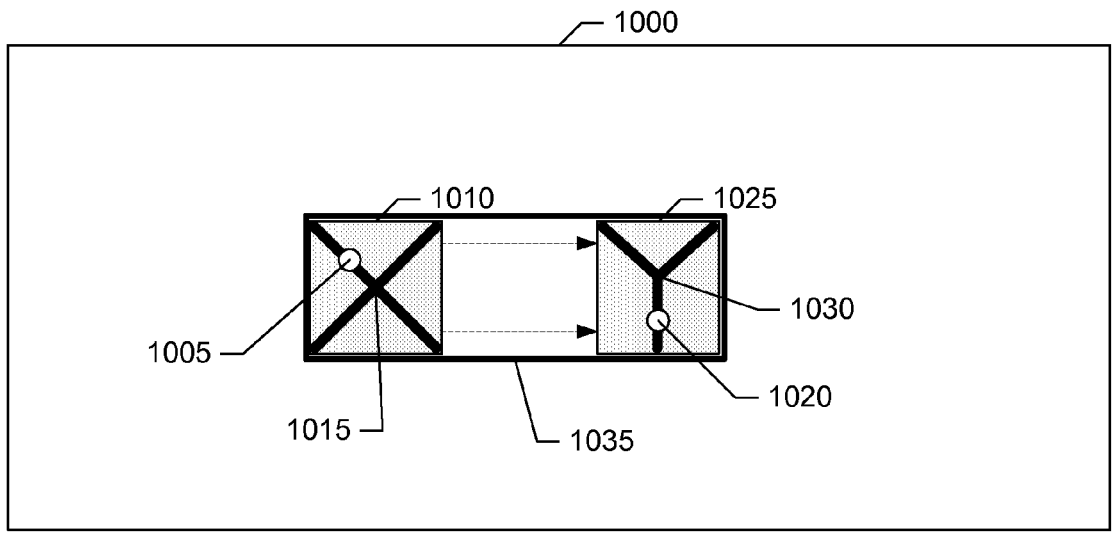
FIG. 10 illustrates an example sequence of operations performed by an example automated region of interest creation technique that may be used to implement the methods and apparatus described herein.
Figure 10:
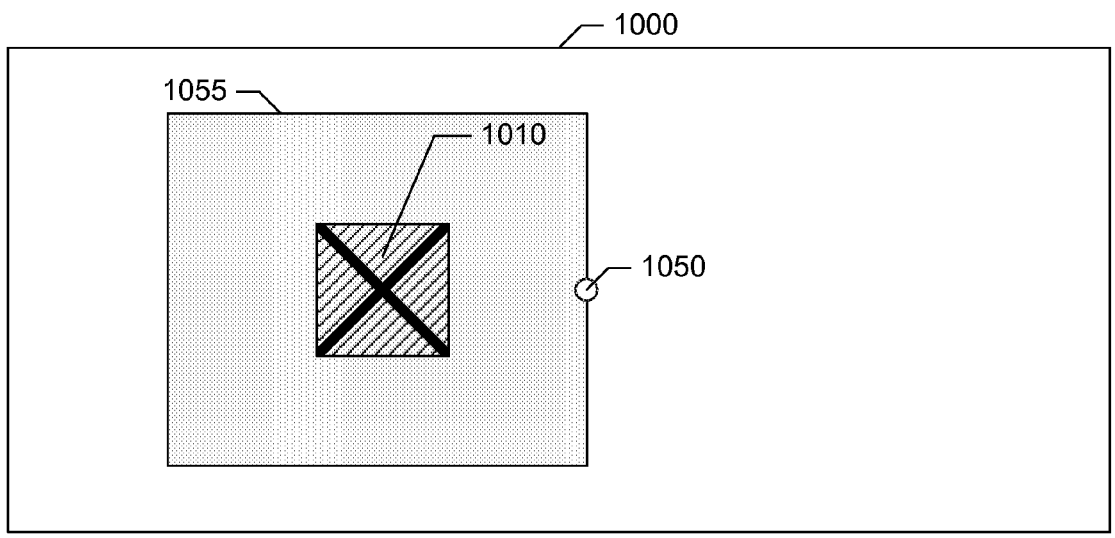
Figure 10:
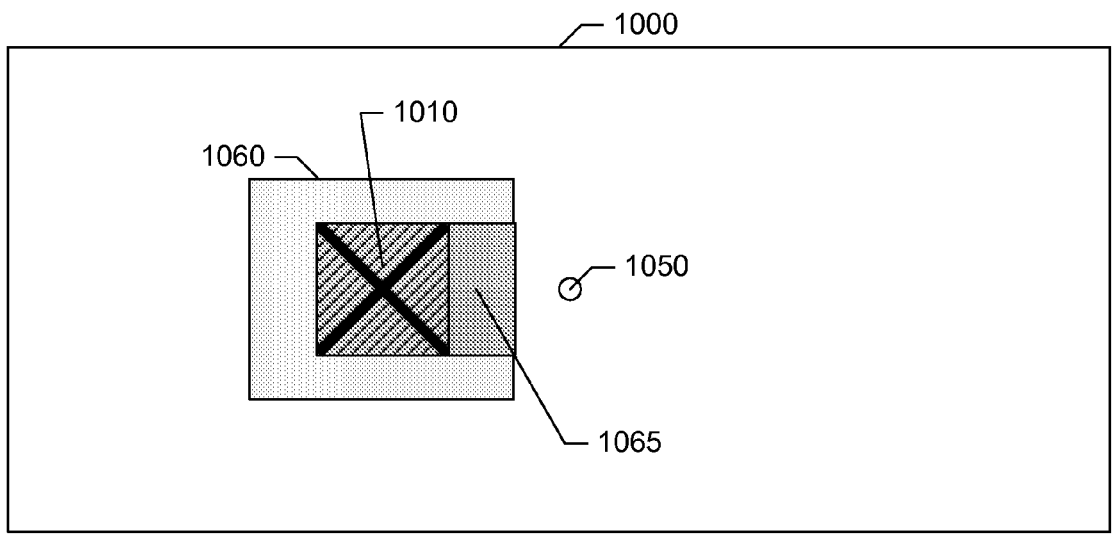

In this automated example region of interest marking technique, the user 170 can create a desired region of interest from scratch or based on a stored and/or previously created region of interest acting as a template. An example sequence of operations to create a region of interest from scratch using this example automated region of interest marking technique is illustrated in FIG. 10. Referring to FIG. 10, to create a region of interest in an example scene 1000 from scratch, the user 170 uses a mouse (or any other appropriate input device) to click anywhere inside the desired region of interest to create a reference point 1005. Once the reference point 1005 is marked, the example GUI 152 determines and displays an initial region 1010 around the reference point 1005 to serve as a template for region of interest creation.

In an example implementation, the automated region of interest marking technique illustrated in FIG. 10 compares adjacent pixels in a recursive manner to automatically generate the initial template region 1010. For example, starting with the initially selected reference point 1005, adjacent pixels in the four directions of up, down, left and right are compared to determine if they are similar (e.g., in luminance and chrominance) to the reference point 1005. If any of these four adjacent pixels are similar, each of those similar adjacent pixels then forms the starting point for another comparison in the four directions of up, down, left and right. This procedure continues recursively until no similar adjacent pixels are found. When no similar adjacent pixels are found, the initial template region 1010 is determined to be a polygon (e.g., specified by vertices, such as a rectangle specified by four vertices) or an ellipse (e.g., specified by major and minor axes) bounding all of the pixels recursively found to be similar to the initial reference point 1005. As an illustrative example, in FIG. 10 the reference point 1005 corresponds to a position on the letter "X" (labeled with reference numeral 1015) as shown. Through recursive pixel comparison, all of the dark pixels comprising the letter "X" (reference numeral 1015) will be found to be similar to the reference point 1005. The initial template region 1010 is then determined to be a rectangular region bounding all of the pixels recursively found to be similar in the letter "X" (reference numeral 1015).

The automated region of interest marking technique illustrated in FIG. 10 can also automatically combine two or more initial template regions to create a single region of interest. As an illustrative example, in FIG. 10, as discussed above, selecting the reference point 1005 causes the initial template region 1010 to be determined as bounding all of the pixels recursively found to be similar in the letter "X" (reference numeral 1015). Next, if the reference point 1020 was selected, a second initial template region 1025 would be determined as bounding all of the pixels recursively found to be similar in the depicted letter "Y" (labeled with reference numeral 1030). After determining the first and second initial template regions 1010 and 1025 based on the respective first and second reference points 1005 and 1020, a combined region of interest 1035 could be determined. For example, the combined region of interest 1035 could be determined as a polygon (e.g., such as a rectangle) or an ellipse bounding all of the pixels in the first and second initial template regions 1010 and 1025. More generally, the union of some or all initial template regions created from associated selected reference points may be used to construct a bounding shape, such as a polygon, an ellipse, etc. Any point inside such a bounding shape is then considered to be part of the created region of interest and, for example, may serve as a brand identifier template.

Additionally or alternatively, a set of helper tools may be used to modify, for example, the template region 1010 in a regular and precise manner through subsequent input commands provided by the user 170. For example, instead of combining the initial template region 1010 with the second template region 1025 as described above, the user 170 can click on a second point 1050 outside the shaded template region 1010 to cause the template region 1010 to grow to the selected second point 1050. The result is a new template region 1055. Similarly, the user 170 can click on a third point (not shown) inside the shaded template region 1010 to cause the template region 1010 to shrink to the selected third point.

Furthermore, the user can access an additional set of helper tools to modify the current template region (e.g., such as the template region 1010) in more ways than only a straightforward shrinking or expanding of the template region to a selected point. In the illustrated example, the helper tool used to modify the template region 1010 to become the template region 1055 was a GROW_TO_POINT helper tool. Other example helper tools include a GROW_ONE_STEP helper tool, a GROW_ONE_DIRECTIONAL_STEP helper tool, a GROW_TO_POINT_DIRECTIONAL helper tool, an UNDO helper tool, etc. In the illustrated example, clicking on the selected point 1050 with the GROW_ONE_STEP helper tool activated would cause the template region 1010 to grow by only one step of resolution to become the new template region 1060. However, if the GROW_ONE_DIRECTIONAL_STEP helper tool were activated, the template region 1010 would grow by one step of resolution only in the direction of the selected point 1015 to become the new template region 1065 (which corresponds to the entire darker shaded region depicted in FIG. 10). If a GROW_TO_POINT_DIRECTIONAL helper tool were activated (example not shown), the template region 1010 would grow to the selected point, but only in the direction of the selected point. In the case of the DIRECTIONAL helper tools, the helper tool determines the side, edge, etc., of the starting template region nearest the selected point to determine in which direction the template region should grow. Additionally, other helper tools may be used to select the type, size, color, etc., of the shape/polygon (e.g., such as a rectangle) used to create the initial template region, to specify the resolution step size, etc. Also, although the example helper tools are labeled using the term "GROW" and the illustrated examples depict these helper tools as expanding the template region 1010, these tools also can cause the template region 1010 to shrink in a corresponding manner by selecting a point inside, instead or outside, the example template region 1010. As such, the example helper tools described herein can cause a starting template region to grow in either an expanding or contracting manner depending upon whether a point is selected outside or inside the template region, respectively.

As mentioned above, the user 170 can also use the example automated region of interest creation technique to create a desired region of interest based on a stored and/or previously created region of interest (e.g., a reference region of interest) acting as a template. To create a region of interest using a stored and/or previously created region of interest, the user 170 uses a mouse (or any other appropriate input device) to select a reference point approximately in the center of the desired region of interest. Alternatively, the user 170 could mark multiple reference points to define a boundary around the desired region of interest. To indicate that the example GUI 152 should create the region of interest from a stored and/or previously created region of interest rather than from scratch, the user 170 may use a different mouse button (or input selector on the input device) and/or press a predetermined key while selecting the reference point(s), press a search button on the graphical display before selecting the reference point(s), etc. After the reference point(s) are selected, the example GUI 152 uses any appropriate template matching procedure (e.g., such as the normalized cross correlation template matching technique described below) to match a region associated with the selected reference point(s) to one or more stored and/or previously created region of interest. The GUI 152 then displays the stored and/or previously created region of interest that best matches the region associated with the selected reference point(s). The user 170 may then accept the returned region or modify the region using the helper tools as described above in the context of creating a region of interest from scratch.

In some cases, a user 170 may wish to exclude an occluded portion of a desired region of interest because, for example, some object is positioned such that it partially obstructs the brand identifier(s) (e.g., logo(s)) included in the region of interest. For example, in the context of a media content presentation of a baseball game, a brand identifier in a region of interest may be a sign or other advertisement position behind home plate which is partially obstructed by the batter. In situations such as these, it may be more convenient to initially specify a larger region of interest (e.g., the region corresponding to the entire sign or other advertisement) and then exclude the occluded portion of the larger region (e.g., the portion corresponding to the batter) to create the final, desired region of interest. To perform such region exclusion, the user 170 may use an EXCLUSION MARK-UP helper tool to create a new region that is overlaid (e.g., using a different color, shading, etc.) on a region of interest initially created from scratch or from a stored and/or previously created region of interest. Additionally, the helper tools already described above (e.g., such as the GROW_TO_POINT, GROW_ONE_STEP, GROW_ONE_DIRECTIONAL_STEP, etc. helper tools) may be used to modify the size and/or shape of the overlaid region. When the user 170 is satisfied with the overlaid region, the GUI 152 excludes the overlaid region (e.g., corresponding to the occlusion) from the initially created region of interest to form the final, desired region of interest.

Returning to FIG. 2, once the information for the current scene, region(s) of interest, and/or brand identifiers included therein has been provided via the GUI 152 for a new scene or a repeated scene of changed interest, the example GUI 152 updates the example learned knowledge database 264 with information concerning, for example, the brand identifier(s) (e.g., logo(s)), identity(ies), location(s), size(s), orientation(s), etc. The resulting updated information may subsequently be used for comparison with another identified scene detected in the media stream 160 of FIG. 1 and/or a scene included in any other media stream(s). Additionally, and as discussed above, a tracker function is then initiated for each newly marked region of interest. The tracker function uses the marked region of interest as a template to track the corresponding region of interest in the adjacent image frames comprising the current detected scene. In particular, an example tracker function determines how a region of interest marked in a key frame of a scene may change (e.g., in location, size, orientation, etc.) over the adjacent image frames comprising the scene. Parameters describing the region of interest and how it changes (if at all) over the scene are used to derive an exposure measurement for brand identifier(s) included in the region of interest, as well as to update the example learned knowledge database 264 with information concerning how the brand identifier(s) included in the region of interest may appear in subsequent scenes.

Furthermore, if the marked region of interest contains an excluded region representing an occluded portion of a larger region of interest (e.g., such as an excluded region marked using the EXCLUSION MARK-UP helper tool described above), the example tracker function can be configured to track the excluded region separately to determine whether the occlusion represented by the excluded region changes and/or lessens (e.g., becomes partially or fully removed) in the adjacent frames. For example, the tracker function can use any appropriate image comparison technique to determine that at least portions of the marked region of interest and at least portions of the excluded region of interest have become similar to determine that the occlusion has changed and/or lessened. If the occlusion changes and/or lessens in the adjacent frames, the example tracker function can combine the marked region of interest with the non-occluded portion(s) of the excluded region to obtain a new composite region of interest and/or composite brand identifier template (discussed below) for use in brand identifier recognition. Next, to continue analysis of brand identifier exposure in the media stream 160 of FIG. 1, the example scene recognizer 252 restarts the media stream 160 of FIG. 1.

As discussed above, to recognize a brand identifier (e.g., logo) appearing in a scene, and to gather information regarding the brand identifier, the example brand exposure monitor 150 of FIG. 2 includes the brand recognizer 254 (also known as the logo detector 254). The example brand recognizer 254 of FIG. 2 determines all brand identifiers appearing in the scene. For example the brand recognizer 254 may recognize brand identifiers in a current scene of interest by comparing the region(s) of interest with one or more reference brand identifiers (e.g., one or more reference logos) stored in the learned knowledge database 264 and/or known brand identifiers stored in the brand library 266. The reference brand identifier information may be stored using any data structure(s) in the brand library 266 and/or the learned knowledge database 264. For example, the brand library 266 and/or the learned knowledge database 264 may store the reference brand identifier information using bitmap files, a repository of JPEG files, etc.

To reduce processing requirements and improve recognition efficiency such that, for example, brand identifiers may be recognized in real-time, the example brand recognizer 254 uses known and/or learned information to analyze the current scene for only those reference brand identifiers expected to appear in the scene. For example, if the current scene is a repeated scene of interest matching a reference (e.g., previously learned or known) scene, the example brand recognizer 254 may use stored information regarding the matched reference scene to determine the region(s) of interest and associated brand identifier(s) expected to appear in the current scene. Furthermore, the example brand recognizer 254 may track the recognized brand identifiers appearing in a scene across the individual image frames comprising the scene to determine additional brand identifier parameters and/or to determine composite brand identifier templates (as discussed above) to aid in future recognition of brand identifiers, to provide more accurate brand exposure reporting, etc.

In an example implementation, the brand recognizer 254 performs template matching to compare a region of interest in the current scene to one or more reference brand identifiers (e.g., one or more reference logos) associated with the matching reference scene. For example, when a user initially marks a brand identifier (e.g., logo) in a detected scene (e.g., such as a new scene), the marked region represents a region of interest. From this marked region of interest, templates of different sizes, perspectives, etc. are created to be reference brand identifiers for the resulting reference scene. Additionally, composite reference brand identifier templates may be formed by the example tracker function discussed above from adjacent frames containing an excluded region of interest representing an occlusion that changes and/or lessens. Then, for a new detected scene, template matching is performed against these various expected reference brand identifier(s) associated with the matching reference scene to account for possible (and expected) perspective differences (e.g., differences in camera angle, zooming, etc.) between a reference brand identifier and its actual appearance in the current detected scene. For example, a particular reference brand identifier may be scaled from one-half to twice its size, in predetermined increments, prior to template matching with the region of interest in the current detected scene. Additionally or alternatively, the orientation of the particular reference brand identifier may be varied over, for example, −30 degrees to +30 degrees, in predetermined increments, prior to template matching with the region of interest in the current detected scene. Furthermore, template matching as implemented by the example brand recognizer 254 may be based on comparing the luminance values, chrominance values, or any combination thereof, for the region(s) of interest and the reference brand identifiers.

An example template matching technique that may be implemented by the example brand recognizer 254 for comparing a region of interest to the scaled versions and/or different orientations of the reference brand identifiers is described in the paper "Fast Normalized Cross Correlation" by J. P. Lewis, available at http://www.idiom.com/~zilla/Work/nvisionInterface/nip.pdf (accessed Oct. 24, 2007), which is submitted herewith and incorporated by reference in its entirety. In an example implementation based on the template matching technique described by Lewis, the example brand recognizer 254 computes the normalized cross correlation (e.g., based on luminance and/or chrominance values) of the region of interest with each template representative of a particular reference brand identifier having a particular scaling and orientation. The largest normalized cross correlation across all templates representative of all the different scalings and orientations of all the different reference brand identifiers of interest is then associated with a match, provided the correlation exceeds a threshold. As discussed in Lewis, the benefits of a normalized cross correlation implementation include robustness to variations in amplitude of the region of interest, robustness to noise, etc. Furthermore, such an example implementation of the example brand recognizer 254 can be implemented using Fourier transforms and running sums as described in Lewis to reduce processing requirements over a brute-force spatial domain implementation of the normalized cross correlation.

To report measurements and other information about brand identifiers (e.g., logos) recognized and/or detected in the example media stream 160, the example brand exposure monitor 150 of FIG. 2 includes a report generator 256. The example report generator 256 of FIG. 2 collects the brand identifiers, along with any associated appearance parameters, etc., determined by the brand recognizer 254, organizes the information, and produces a report. The report may be output using any technique(s) such as, for example, printing to a paper source, creating and/or updating a computer file, updating a database, generating a display, sending an email, etc.

While an example manner of implementing the example brand exposure monitor 150 of FIG. 1 has been illustrated in FIG. 2, some or all of the elements, processes and/or devices illustrated in FIG. 2 may be combined, divided, re-arranged, omitted, eliminated and/or implemented in any way. Further, the example scene recognizer 252, the example brand recognizer 254, the example GUI 152, the example mass memory 260, the example scene database 262, the example learned knowledge database 264, the example brand library 266, the report generator 256, and/or more generally, the example brand exposure monitor 150 may be implemented by hardware, software, firmware and/or any combination of hardware, software and/or firmware. Thus, for example, any of the example scene recognizer 252, the example brand recognizer 254, the example GUI 152, the example mass memory 260, the example scene database 262, the example learned knowledge database 264, the example brand library 266, the report generator 256, and/or more generally, the example brand exposure monitor 150 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example brand exposure monitor 150, the example scene recognizer 252, the example brand recognizer 254, the example GUI 152, the example mass memory 260, the example scene database 262, the example learned knowledge database 264, the example brand library 266 and/or the report generator 256 are hereby expressly defined to include a tangible medium such as a memory, digital versatile disk (DVD), compact disk (CD,) etc. Moreover, the example brand exposure monitor 150 may include one or more elements, processes, and/or devices instead of, or in addition to, those illustrated in FIG. 2, and/or may include more than one of any or all of the illustrated, processes and/or devices.

Figure 3:
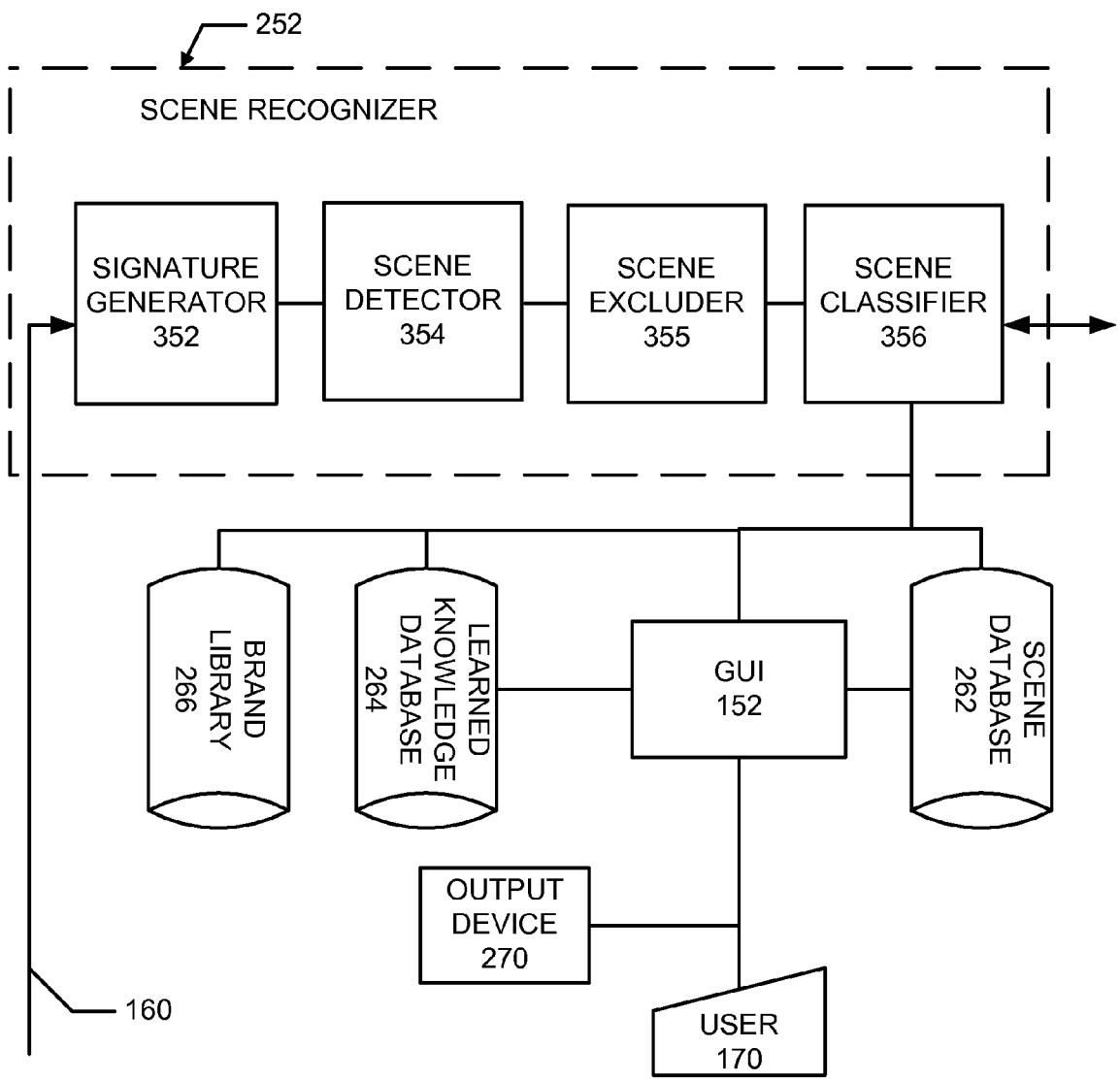
FIG. 3 illustrates an example manner of implementing the example scene recognizer of FIG. 2.

An example manner of implementing the example scene recognizer 252 of FIG. 2 is shown in FIG. 3. The example scene recognizer 252 of FIG. 3 includes a signature generator 352 to create one or more image signatures for each frame (possibly after sub-sampling) included in, for example, the media stream 160. The one or more image signatures are then used for scene identification and/or scene change detection. In the illustrated example, the signature generator 252 generates the image signature for an image frame included in the media stream 160 by creating an image histogram of the luminance and/or chrominance values included in the image frame.

To implement scene identification and scene change detection as discussed above, the example scene recognizer 252 of FIG. 3 includes a scene detector 354. The example scene detector 354 of the illustrated example detects scenes in the media stream 160 by comparing successive image frames to a starting frame representative of a current scene being detected. As discussed above, successive image frames that have similar image signatures are grouped together to form a scene. One or more images and their associated signatures are then used to form the key frame(s) and associated key signature(s) for the detected frame. In the illustrated example, to detect a scene by determining whether a scene change has occurred, the example scene detector 354 compares the generated image signature for a current image frame with the image signature for the starting frame (or the appropriate key frame) of the scene currently being detected. If the generated image signature for the current image frame is sufficiently similar to the starting frame's (or key frame's) image signature (e.g., when negligible motion has occurred between successive frames in the media stream 160, when the camera parameters are substantially the same and the backgrounds are statistically stationary, etc.), the example scene detector 354 includes the current image frame in the current detected scene, and the next frame is then analyzed by comparing it to the starting frame (or key frame) of the scene. However, if the scene detector 354 detects a significant change between the image signatures (e.g., in the example of presentation of a baseball game, when a batter in the preceding frame is replaced by an outfielder in the current image frame of the media stream 160), the example scene detector 354 identifies the current image frame as starting a new scene, stores the current image frame as the starting frame (and/or key frame) for that new scene, and stores the image signature for the current frame for use as the starting image signature (and/or key signature) for that new scene. The example scene detector then marks the immediately previous frame as the ending frame for the current scene and determines one or more key frames and associated key image signature(s) to represent the current scene. As discussed above, the key frame and key image signature for the current scene may be chosen to be, for example, the frame and signature corresponding to the first frame in the scene, the last frame in the scene, the midpoint frame in the scene, etc. In another example, the key frame and key image signature may be determined to be an average and/or some other statistical combination of the frames and/or signatures corresponding to the detected scene. The current scene is then ready for scene classification.

The example scene recognizer 252 of FIG. 3 also includes a scene excluder 355 to exclude certain detected scenes from brand exposure processing. As discussed above, a detected scene may be excluded under circumstances where it is likely the scene will not contain any brand identifiers (e.g., logos). In an example implementation, the scene excluder 355 is configured to use domain knowledge corresponding to the particular type of media content being processed to determine when a detected scene exhibits characteristics indicating that the scene will not contain any brand identifiers. If a detected scene is excluded, the scene excluder 355 of the illustrated example invokes the report generator 256 of FIG. 2 to report the excluded scene.

To categorize a non-excluded, detected scene, the example scene recognizer 252 of FIG. 2 includes a scene classifier 356. The example scene classifier 356 compares the current detected scene (referred to as the current scene) to one or more reference scenes (e.g., previously learned and/or known scenes) stored in the scene database 262 and/or the learned knowledge database 264. For example, the scene classifier 356 may compare an image signature representative of the current scene to one or more reference image signatures representative of one or more respective reference scenes. Based on the results of the comparison, the example scene classifier 356 classifies the current scene into one of the following four categories: a repeated scene of interest, a repeated scene of changed interest, a new scene, or a scene of no interest. For example, if the current scene's image signature does not match any reference scene's image signature, the example scene classifier 356 classifies the scene as a new scene and displays the current scene via the output device 270 on FIG. 2. For example, a prompt is shown via the GUI 152 to alert the user 170 of the need to identify the scene.

However, if the current scene's image signature matches a reference scene's image signature and the corresponding reference scene has already been marked as a scene of no interest, information describing the current scene (e.g., such as its key frame, key signature, etc.) for use in detecting subsequent scenes of no interest is stored in the example learned knowledge database 264 and the next scene in the media stream 160 is analyzed. If, however, a match is found and the corresponding reference scene has not been marked as a scene of no interest, the example scene classifier 356 then determines one or more expected regions of interest in the detected scene based on region of interest information corresponding to the matched reference scene. The example scene classifier 356 then invokes the example brand recognizer 254 to perform brand recognition by comparing the expected region(s) of interest included in the current scene with one or more reference brand identifiers (e.g., previously learned and/or known brand identifiers) stored in the learned knowledge database 264 and/or the brand library 266. Then, if one or more regions of interest included in the identified scene do not match any of the corresponding expected reference brand identifier stored in the learned knowledge database 264 and/or the brand database 266, the current scene is classified as a repeated scene of changed interest and displayed at the output device 270. For example, a prompt may be shown via the GUI 152 to alert the user 170 of the need to detect and/or identify one or more brand identifiers included in the non-matching region(s) of interest. The brand identifier (e.g., logo) marking/identification provided by the user 170 is then used to update the learned knowledge database 264. Additionally, if the current scene was a new scene, the learned knowledge database 264 may be updated to use the current detected scene as a reference for detecting future repeated scenes of interest. However, if all of the region(s) of interest included in the current scene match the corresponding expected reference brand identifier(s) stored in the learned knowledge database 264 and/or the brand database 266, the current scene is classified as a repeated scene of interest and the expected region(s) of interest are automatically analyzed by the brand recognizer 254 to provide brand exposure reporting with no additional involvement needed by the user 170. Furthermore, and as discussed above, a tracker function is then initiated for each expected region of interest. The tracker function uses the expected region of interest as a template to track the corresponding region of interest in the adjacent image frames comprising the current detected scene. Parameters describing the region of interest and how it changes over the scene are used to derive an exposure measurement for brand identifier(s) included in the region of interest, as well as to update the example learned knowledge database 264 with information concerning how the brand identifier(s) included in the region of interest may appear in subsequent scenes.

While an example manner of implementing the example scene recognizer 252 of FIG. 2 has been illustrated in FIG. 3, some or all of the elements, processes and/or devices illustrated in FIG. 3 may be combined, divided, re-arranged, omitted, eliminated and/or implemented in any way. Further, the example signature generator 352, the example scene detector 354, the example scene classifier 356, and/or more generally, the example scene recognizer 252 of FIG. 3 may be implemented by hardware, software, firmware and/or any combination of hardware, software and/or firmware. Moreover, the example scene recognizer 252 may include data structures, elements, processes, and/or devices instead of, or in addition to, those illustrated in FIG. 3 and/or may include more than one of any or all of the illustrated data structures, elements, processes and/or devices.

Figure 4:
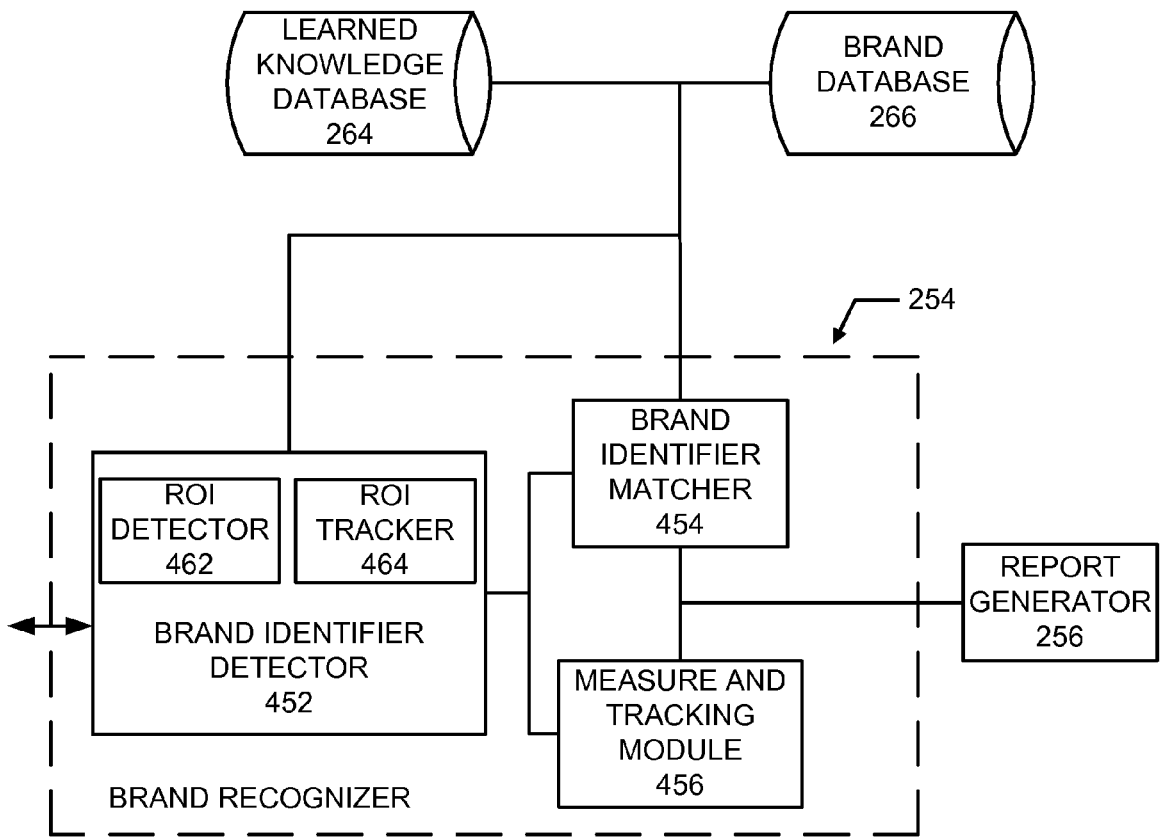
FIG. 4 illustrates an example manner of implementing the example brand recognizer of FIG. 2.

An example manner of implementing the example brand recognizer 254 of FIG. 2 is shown in FIG. 4. To detect one or more brand identifiers (e.g., one or more logos) in a region of interest of the identified scene, the example brand recognizer 254 of FIG. 4 includes a brand identifier detector 452. The example brand identifier detector 452 of FIG. 4 compares the content of each region of interest specified by, for example, the scene recognizer 252 of FIG. 2, with one or more reference (e.g., previously learned and/or known) brand identifiers corresponding to a matched reference scene and stored in the example learned knowledge database 264 and/or the brand library 266. For example, and as discussed above, the brand identifier detector 452 may perform template matching to compare the region of interest to one or more scaled versions and/or one or more different orientations of the reference brand identifiers (e.g., reference logos) stored in the learned knowledge database 264 and/or the brand library 266 to determine brand identifiers (e.g., logos) included in the region of interest.

For example, the brand identifier detector 452 may include a region of interest (ROI) detector 464 and a ROI tracker 464. The example ROI detector 462 locates an ROI in a key frame representing the current scene by searching each known or previously learned (e.g., observed) ROI associated with the current scene's matching reference scene. Additionally, the example ROI detector 462 may search all known or previously learned locations, perspectives (e.g., size, angle, etc.), etc., for each expected ROI associated with the matching reference scene. Upon finding an ROI in the current scene that matches an expected ROI in the reference scene, the observed ROI, its locations, its perspectives, and its association with the current scene are stored in the learned knowledge database 264. The learned knowledge database 264, therefore, is updated with any new learned information each time an ROI is detected in a scene. The example ROI tracker 464 then tracks the ROI detected by the ROI detector 464 in the key frame of the current scene. For example, the ROI tracker 464 may search for the detected ROI in image frames adjacent to the key frame of the current scene, and in a neighborhood of the known location and perspective of the detected ROI in the key frame of the current scene. During the tracking process, appearance parameters, such as, for example, location, size, matching quality, visual quality, etc. are recorded for assisting the detection of ROI(s) in future repeated image frames and for deriving exposure measurements. (These parameters may be used as search keys and/or templates in subsequent matching efforts.) The example ROI tracker 464 stops processing the current scene when all frames in the scene are processed and/or when the ROI cannot be located in a certain specified number of consecutive image frames.

To identify the actual brands associated with one or more brand identifiers, the example brand recognizer 254 of FIG. 4 includes a brand identifier matcher 454. The example brand identifier matcher 454 processes the brand identifier(s) detected by the brand identifier detector 452 to obtain brand identity information stored in the brand database 266. For example, the brand identity information stored in the brand database 266 may include, but is not limited to, internal identifiers, names of entities (e.g., corporations, individuals, etc.) owning the brands associated with the brand identifiers, product names, service names, etc.

To measure the exposure of the brand identifiers (e.g., logos) detected in, for example, the scenes detected in the media stream 160, the example brand recognizer 254 of FIG. 4 includes a measure and tracking module 456. The example measure and tracking module 456 of FIG. 4 collects appearance data corresponding to the detected/recognized brand identifier(s) (e.g., logos) included in the image frames of each detected scene, as well as how the detected/recognized brand identifier(s) (e.g., logos) may vary across the image frames comprising the detected scene. For example, such reported data may include information regarding location, size, orientation, match quality, visual quality, etc., for each frame in the detected scene. (This data enables a new ad payment/selling model wherein advertisers pay per frame and/or time of exposure of embedded brand identifiers.) In an example implementation, the measure and tracking module 456 determines a weighted location and size for each detected/recognized brand identifier. For example, the measure and tracking module 456 may weight the location and/or size of a brand identifier by the duration of exposure at that particular location and/or size to determine the weighted location and/or size information. A report of brand exposure may be generated from the aforementioned information by a report generator 256.

While an example manner of implementing the example brand recognizer 254 of FIG. 2 has been illustrated in FIG. 4, some or all of the elements, processes and/or devices illustrated in FIG. 4 may be combined, divided, re-arranged, omitted, eliminated and/or implemented in any way. Further, the example brand identifier detector 452, the example brand identifier matcher 454, the example measure and tracking module 456, and/or more generally, the example brand recognizer 254 of FIG. 4 may be implemented by hardware, software, firmware and/or any combination of hardware, software and/or firmware. Thus, for example, any of the example brand identifier detector 452, the example brand identifier matcher 454, the example measure and tracking module 456, and/or more generally, the example brand recognizer 254 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example brand recognizer 254, the example brand identifier detector 452, the example brand identifier matcher 454 and/or the example measure and tracking module 456 are hereby expressly defined to include a tangible medium such as a memory, digital versatile disk (DVD), compact disk (CD,) etc. Moreover, the example brand recognizer 254 of FIG. 4 may include one or more elements, processes, and/or devices instead of, or in addition to, those illustrated in FIG. 4, and/or may include more than one of any or all of the illustrated elements, processes and/or devices.

Figure 5A:
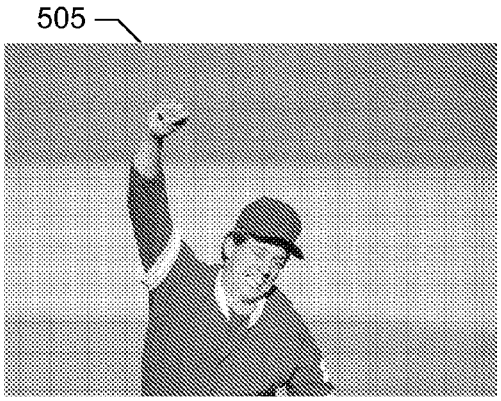
FIGS. 5A-5D illustrate example scene classifications made by the example scene recognizer of FIG. 2.
Figure 5A:
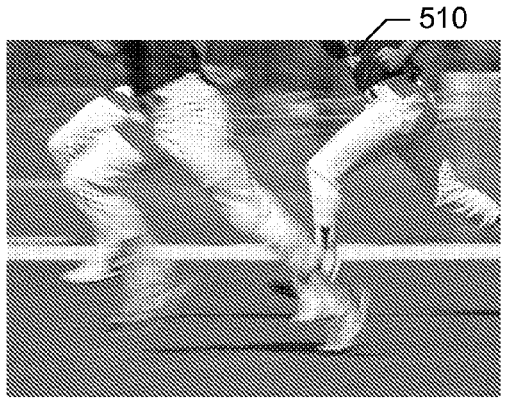
Figure 5A:
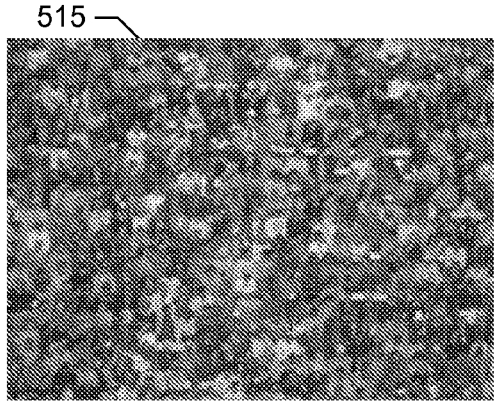
Figure 5A:
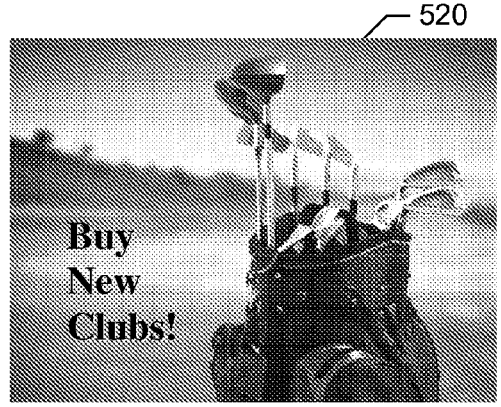

To better illustrate the operation of the example signature generator 352, the example scene detector 354, the example scene excluder 355, the example scene classifier 356, the example ROI detector 464 and the example ROI tracker 464, example scenes that could be processed to measure brand exposure are shown in FIGS. 5A-5D. The example scenes shown in FIGS. 5A-5D are derived from a media stream 160 providing example broadcasts of sporting events. The example sporting event broadcasts are merely illustrative and the methods and apparatus disclosed herein are readily applicable to processing media streams to determine brand exposure associated with any type of media content. Turning to the figures, FIG. 5A illustrates four example key frames 505, 510, 515 and 525 associated with four respective example scenes which could qualify for scene exclusion based on known or learned domain knowledge. In particular, the example key frame 505 depicts a scene having a background (e.g., a golf course) that includes a predominance of uniformly grouped greenish pixels. If the domain knowledge corresponding to the type of media content that generated the example key frame 505 (e.g., such as an expected broadcast of a golfing event) indicates that a scene including a predominance of uniformly grouped greenish pixels should be excluded because it corresponds to a camera shot of the playing field (e.g., golf course), the example scene excluder 355 could be configured with such knowledge and exclude the scene corresponding to the example key frame 505.

The example key frame 510 corresponds to a scene of short duration because the scene includes a predominance of components in rapid motion. In an example implementation, the scene excluder 355 could be configured to exclude such a scene because it is unlikely a brand identifier would remain in the scene for sufficient temporal duration to be observed meaningfully by a person consuming the media content. The example key frame 515 corresponds to a scene of a crowd of spectators at the broadcast sporting event. Such a scene could also be excluded by the example scene excluder 355 if, for example, the domain knowledge available to the scene excluder 355 indicated that a substantially uniform, mottled scene corresponds to an audience shot and, therefore, is not expected to include any brand identifier(s). The example key frame 520 corresponds to a scene from a commercial being broadcast during the example broadcasted sporting event. In an example implementation, the scene excluder 355 could be configured to excludes scenes corresponding to a broadcast commercial (e.g., based on a detected audio code in the example media stream 160, based on a detected transition (e.g., blank screen) in the example media stream 160, etc.) if, for example, brand exposure reporting is to be limited to embedded advertisements.

Figure 5B:
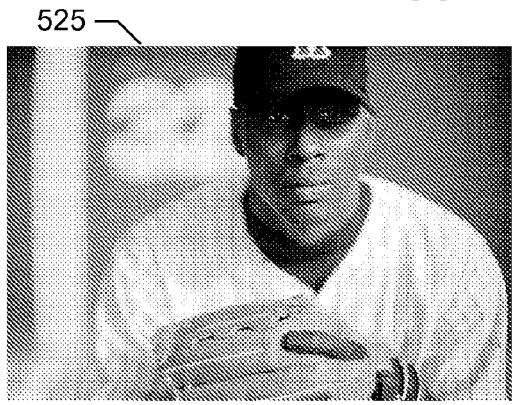
Figure 5B:
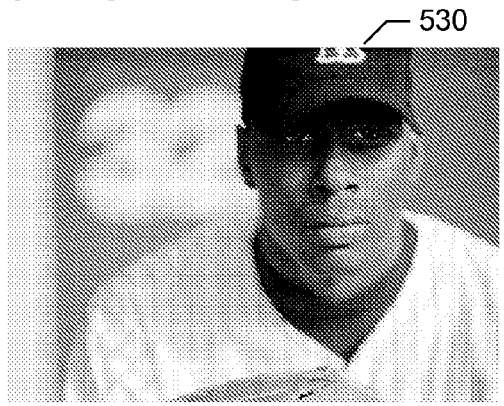

FIG. 5B illustrates two example key frames 525 and 530 associated with two example scenes which could be classified as scenes of no interest by the example scene classifier 356. In the illustrated example, the key frame 525 corresponds to a new detected scene that may be marked by the user 170 as a scene of no interest because the example key frame 525 does not include any brand identifiers (e.g., logos). The scene corresponding to the key frame 525 then becomes a learned reference scene of no interest. Next, the example key frame 530 corresponds to a subsequent scene detected by the example scene detector 354. By comparing the similar image signatures (e.g., image histograms) for the key frame 520 to the key frame 530 of the subsequent detected scene, the example scene classifier 356 may determine that the image frame 530 corresponds to a repeat of the reference scene corresponding to the example key frame 525. In such a case, the example scene classifier 356 would then determine that the key frame 530 corresponds to a repeated scene of no interest because the matching reference scene corresponding to the example key frame 525 had been marked as a scene of no interest.

Figure 5C:
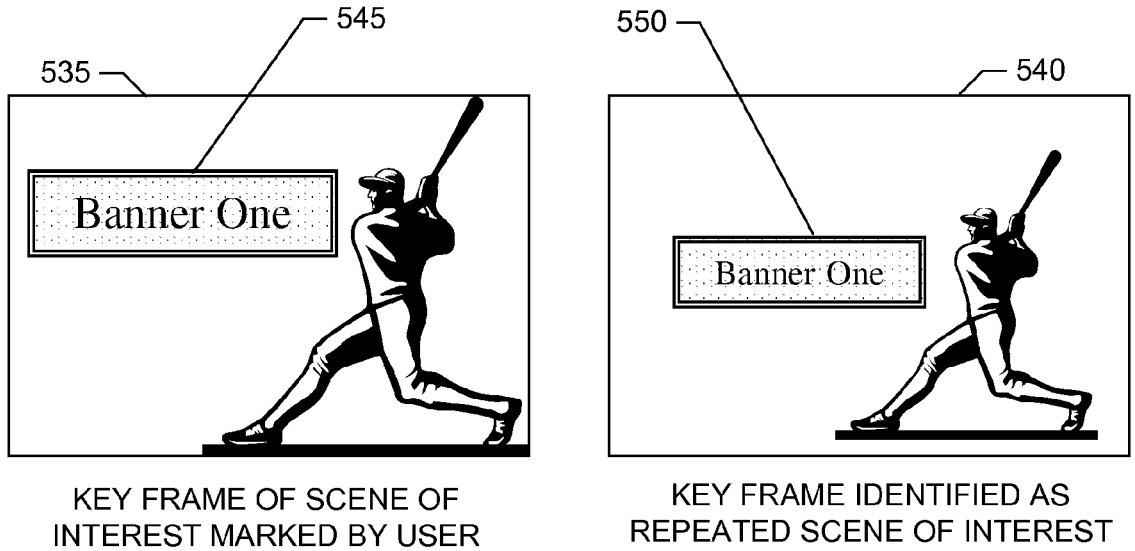

FIG. 5C illustrates two example key frames 535 and 540 associated with two example scenes which could be classified as scenes of interest by the example scene classifier 356. In the illustrated example, the key frame 535 corresponds to a new detected scene that may be marked by the user 170 as a scene of interest because the example key frame 535 has a region of interest 545 including a brand identifier (e.g., the sign advertising "Banner One"). The scene corresponding to the key frame 535 would then become a learned reference scene of interest. Furthermore, the user 170 may mark the region of interest 545, which would then be used by the example ROI tracker 464 to create one or more reference brand identifier templates for detecting subsequent repeated scenes of interest corresponding to this reference scene and region of interest. Next, the example key frame 540 corresponds to a subsequent scene detected by the example scene detector 354. By comparing the similar image signatures (e.g., image histograms) for the key frame 535 and the key frame 540 of the subsequent detected scene, the example scene classifier 356 may determine that the image frame 540 corresponds to a repeat of the reference scene corresponding to the example key frame 535. Because the reference scene is a scene of interest, the example scene classifier 356 would then invoke the example ROI detector 462 to find the appropriate expected region of interest in the example key frame 540 based on the reference template(s) corresponding to the reference region of interest 535. In the illustrated example, the ROI detector 462 finds the region of interest 550 corresponding to the reference region of interest 535 because the two regions of interest are substantially similar except for expected changes in orientation, size, location, etc. Because the example ROI detector 462 found and verified the expected region of interest 550 in the illustrated example, the example scene classifier 356 would classify the scene corresponding to the example key frame 540 as a repeated scene of interest relative to the reference scene corresponding to the example key frame 535.

Figure 5D:
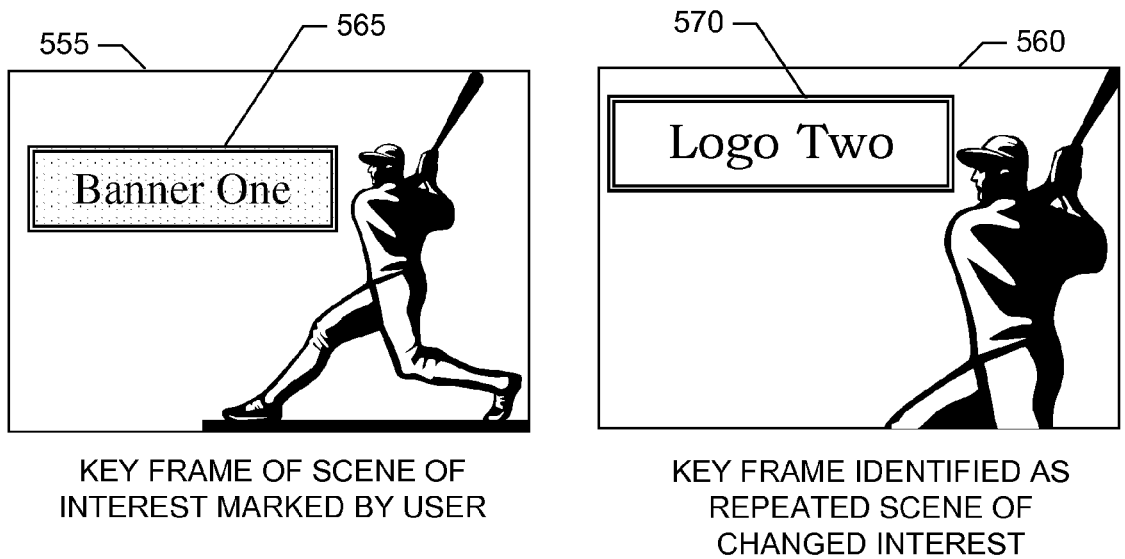

FIG. 5D illustrates two example key frames 555 and 560 associated with two example scenes which could be classified as scenes of interest by the example scene classifier 356. In the illustrated example, the key frame 555 corresponds to a new detected scene that may be marked by the user 170 as a scene of interest because the example key frame 555 has a region of interest 565 including a brand identifier (e.g., the sign advertising "Banner One"). The scene corresponding to the key frame 555 would then become a learned reference scene of interest. Furthermore, the user 170 may mark the region of interest 565, which would then be used by the example ROI tracker 464 to create one or more reference brand identifier templates for detecting subsequent repeated scenes of interest corresponding to this reference scene and region of interest. Next, the example key frame 560 corresponds to a subsequent scene detected by the example scene detector 354. By comparing the similar image signatures (e.g., image histograms) for the key frame 555 and the key frame 560 of the subsequent detected scene, the example scene classifier 356 may determine that the image frame 560 corresponds to a repeat of the reference scene corresponding to the example key frame 555. Because the reference scene is a scene of interest, the example scene classifier 356 would then invoke the example ROI detector 462 to find the appropriate expected region of interest in the example key frame 560 based on the reference template(s) corresponding to the reference region of interest 565.

In the illustrated example, the ROI detector 462 does not find any region of interest corresponding to the reference region of interest 565 because there is no brand identifier corresponding to the advertisement "Banner One" in the example key frame 560. Because the example ROI detector was unable to verify the expected region of interest in the illustrated example, the example scene classifier 356 would classify the scene corresponding to the example key frame 560 as a repeated scene of changed interest relative to the reference scene corresponding to the example key frame 555. Next, because the scene corresponding to the example key frame 560 is classified as a repeated scene of changed interest, the user 170 would be requested to mark any brand identifier(s) included in the scene. In the illustrated example, the user 170 may mark the region of interest 570 because it includes a brand identifier corresponding to a sign advertising "Logo Two." The example ROI tracker 464 would then be invoked to create one or more reference brand identifier templates based on the marked region of interest 570 for detecting subsequent repeated scenes of interest including this new reference region of interest.

Figure 6A:
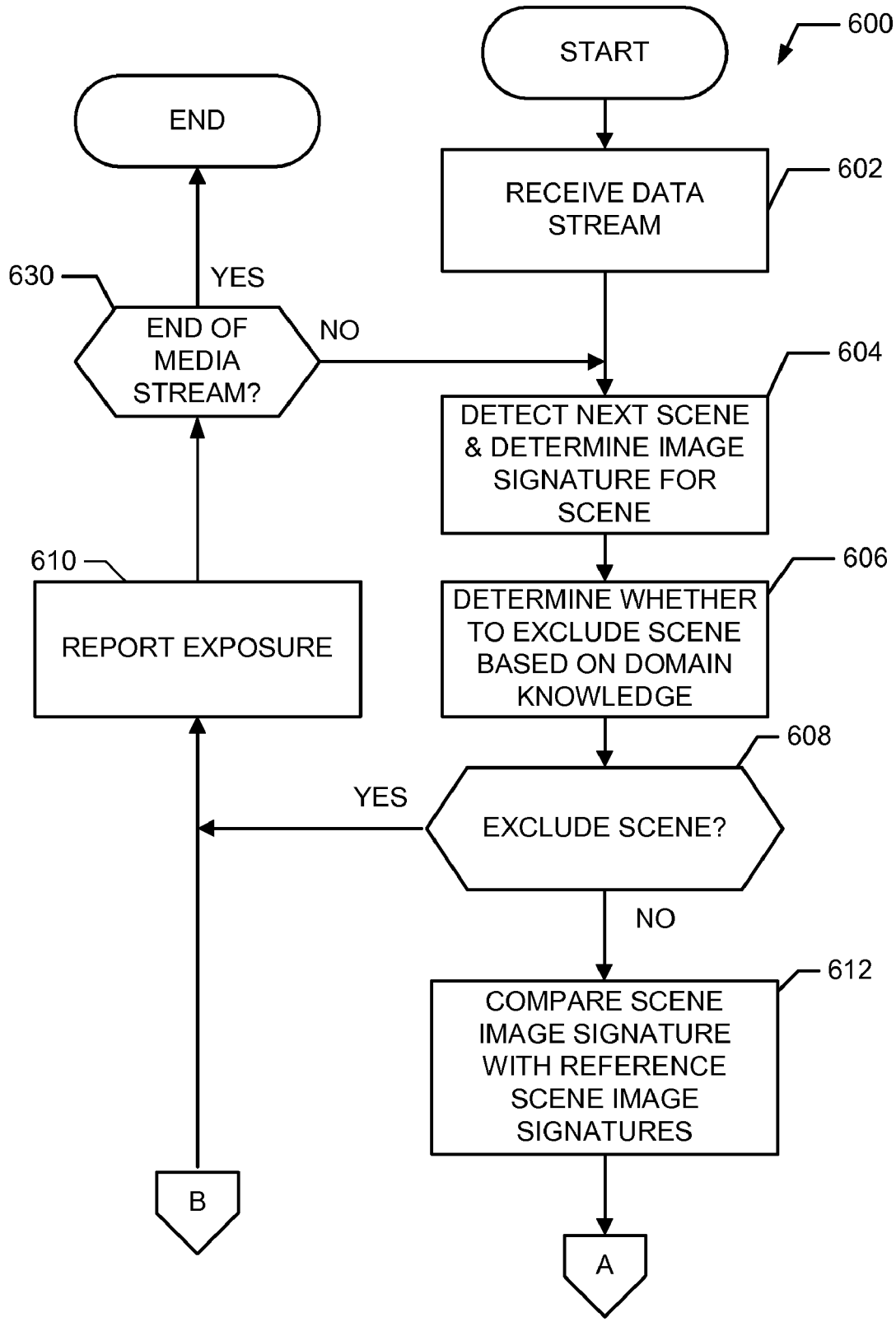
FIGS. 6A-6B collectively from a flowchart representative of example machine accessible instructions that may be executed to implement the example scene recognizer of FIG. 2.
Figure 6B:
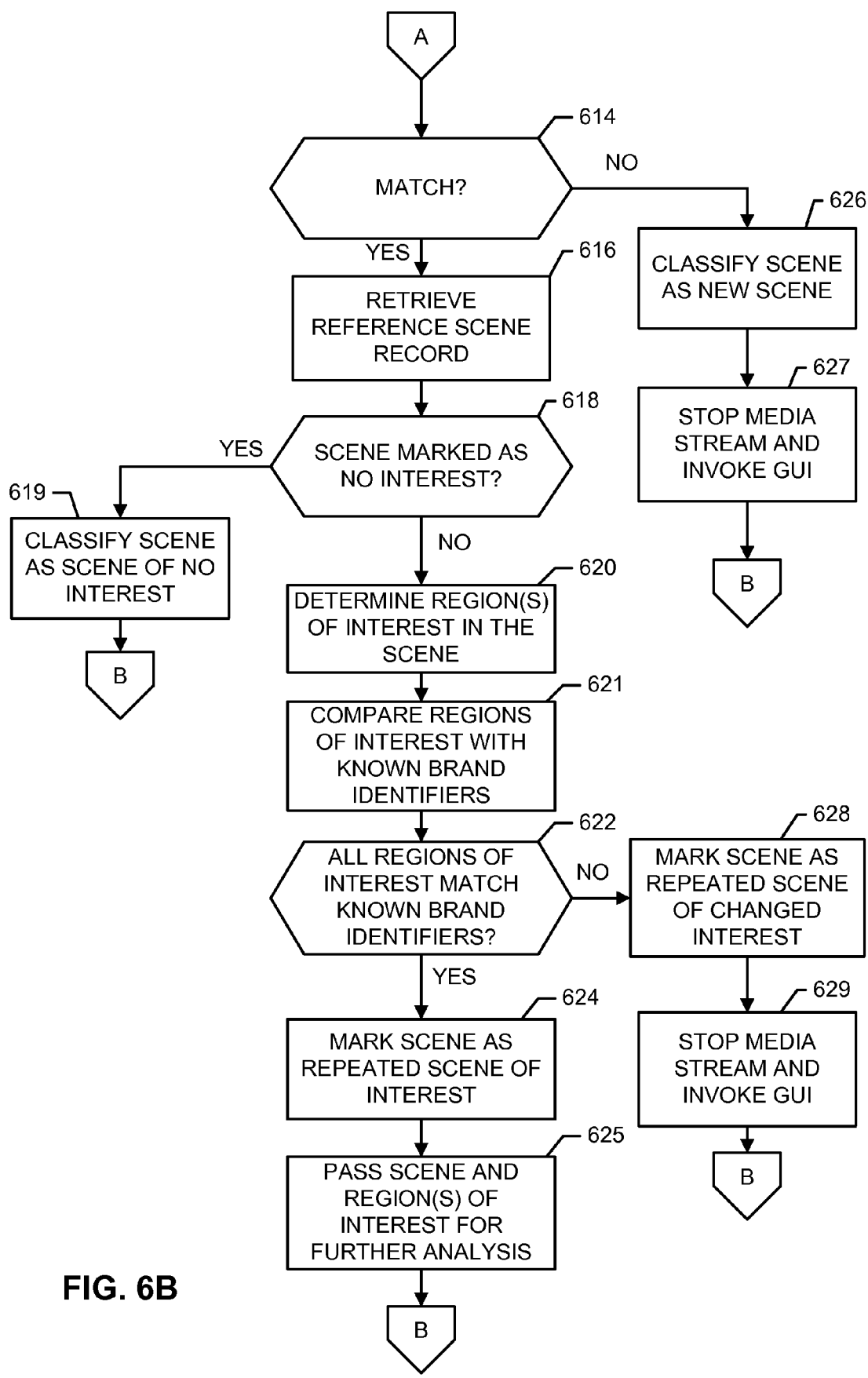
Figure 7A:
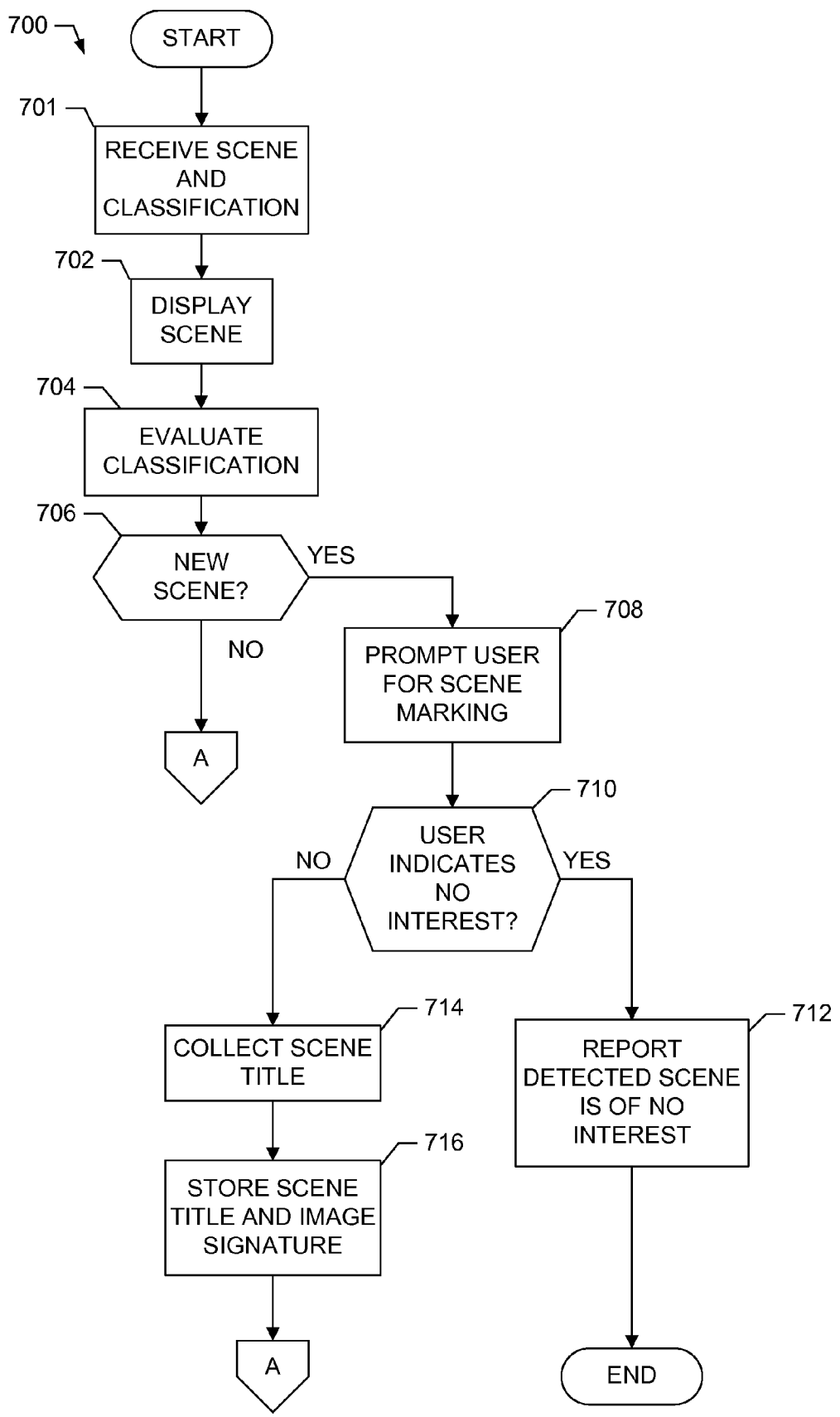
FIGS. 7A-7C collectively from a flowchart representative of example machine accessible instructions that may be executed to implement the example graphical user interface (GUI) of FIG. 2.
Figure 7B:
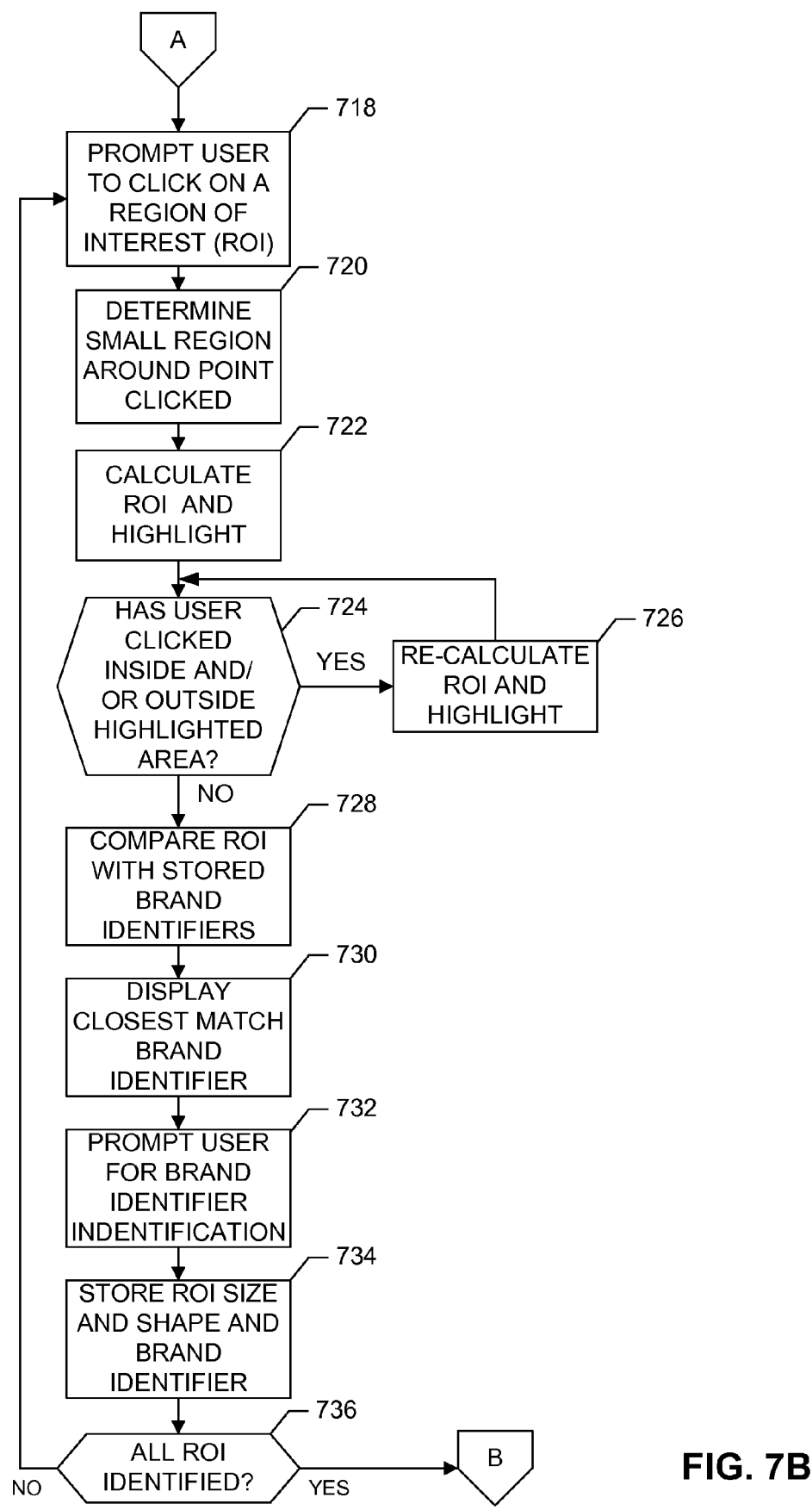
Figure 7C:
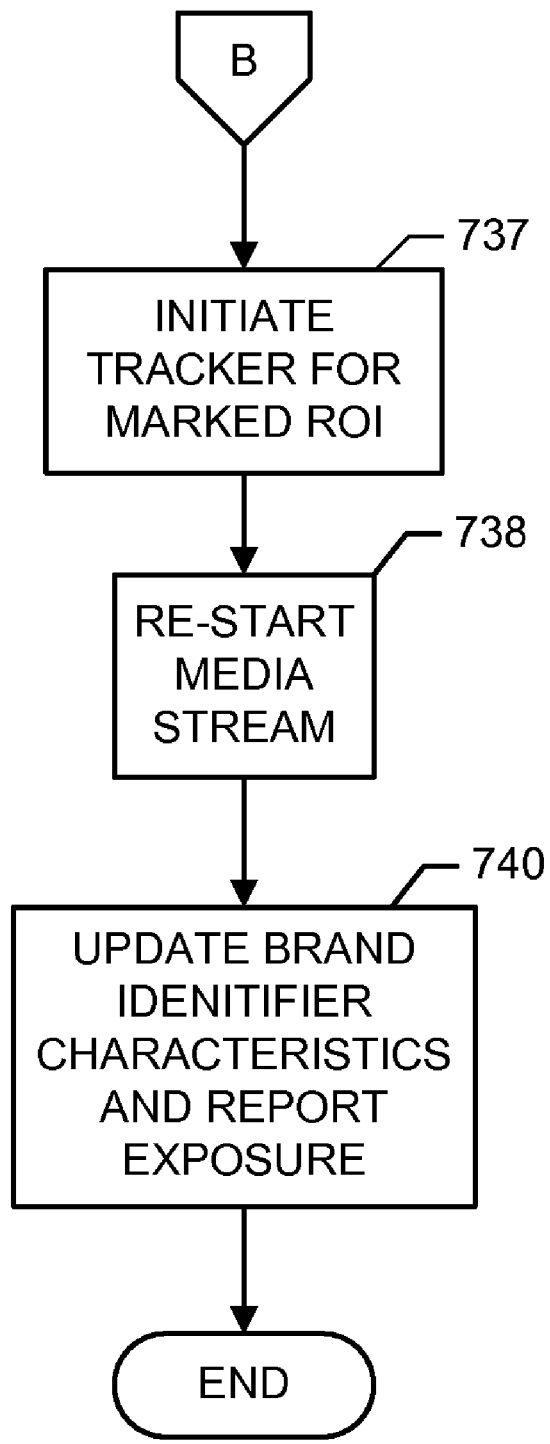

FIGS. 6A-6B collectively form a flowchart representative of example machine accessible instructions 600 that may be executed to implement the example scene recognizer 252 of FIGS. 2 and/or 3, and/or at least a portion of the example brand exposure monitor 150 of FIGS. 1 and/or 2. FIGS. 7A-7C collectively form a flowchart representative of example machine accessible instructions 700 that may be executed to implement the example GUI 152 of FIGS. 1 and/or 2, and/or at least a portion of the example brand exposure monitor 150 of FIGS. 1 and/or 2. FIGS. 8A-8B are flowcharts representative of example machine accessible instructions 800 and 850 that may be executed to implement the example brand recognizer 254 of FIGS. 2 and/or 3, and/or at least a portion of the example brand exposure monitor 150 of FIGS. 1 and/or 2. The example machine accessible instructions of FIGS. 6A-6B, 7A-7C and/or 8A-8B may be carried out by a processor, a controller and/or any other suitable processing device. For example, the example machine accessible instructions of FIGS. 6A-6B, 7A-7C and/or 8A-8B may be embodied in coded instructions stored on a tangible medium such as a flash memory, a read-only memory (ROM) and/or random-access memory (RAM) associated with a processor (e.g., the example processor 905 discussed below in connection with FIG. 9). Alternatively, some or all of the example brand exposure monitor 150, the example GUI 152, the example scene recognizer 252, and/or the example brand recognizer 254 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIGS. 6A-B, 7A-C and/or 8A-8B may be implemented manually or as any combination of any of the foregoing techniques, for example, any combination of firmware, software, discrete logic and/or hardware. Further, although the example machine accessible instructions are described with reference to the example flowcharts of FIGS. 6A-6B, 7A-7C and 8A-8B, many other methods of implementing the machine accessible instructions of FIGS. 6A-6B, 7A-7C, and/or 8A-8B may be employed. For example, the order of execution of the blocks may be changed, and/or one or more of the blocks described may be changed, eliminated, sub-divided, or combined. Additionally, some or all of the example machine accessible instructions of FIGS. 6A-6, 7A-7C and/or 8A-8B may be carried out sequentially and/or carried out in parallel by, for example, separate processing threads, processors, devices, discrete logic, circuits, etc.

Turning to FIGS. 6A-6B, execution of the example machine executable instructions 600 begins with the example scene recognizer 252 included in the example brand exposure monitor 150 receiving a media stream, such as the example media stream 160 of FIG. 1 (block 602 of FIG. 6A). The example scene recognizer 252 then detects a scene included in the received media stream 160 by comparing image signatures created for image frames of the media stream 160 (block 604). As discussed above, successive image frames that have substantially similar image signatures (e.g., such as substantially similar image histograms) are identified to be part of the same scene. In an example implementation, one of the substantially similar image frames will be stored as a key frame representative of the scene, and the image signature created for the key frame will serve as the detected scene's image signature. An example technique for generating the image signature at block 604 which uses image histograms is discussed above in connection with FIG. 2.

Next, the example scene recognizer 252 performs scene exclusion by examining the key frame of the current scene detected at block 604 for characteristics indicating that the scene does not include any brand identifiers (e.g., logos) (block 606). For example, and as discussed above, domain knowledge specific to the type of media content expected to be processed may be used to configure the example scene recognizer 252 to recognize scene characteristics indicative of a scene lacking any brand identifiers that could provide brand exposure. In the context of the baseball game example, a scene characterized as primarily including a view of a blue sky (e.g., when following pop-up fly ball), a view of the ground (e.g., when following a ground ball), or having a quickly changing field of view (e.g., such as when a camera pans to follow a base runner), etc., may be excluded at block 606.

If the current detected scene is excluded (block 608), the example scene recognizer 252 invokes the report generator 256 to report the exclusion of the current detected scene (block 610). Additionally or alternatively, the example scene recognizer 252 may store information describing the excluded scene as learned knowledge to be used to exclude future detected scenes and/or classify future scenes as scenes of no interest. The example scene recognizer 252 then examines the media stream 160 to determine whether the media stream 160 has ended (block 630). If the end of the media stream 160 has been reached, execution of the example machine accessible instructions 600 ends. If the media stream 160 has not completed (block 630), control returns to block 604 to allow the example scene recognizer 252 to detect a next scene in the media stream 160.

Returning to block 608, if the current detected scene (also referred to as the "current scene") is not excluded, the example scene recognizer 252 compares the current scene with one or more reference (e.g., previously learned and/or known) scenes stored in one or more databases (e.g., the scene database 262 and/or the learned knowledge database 264 of FIG. 2) (block 612). An example technique for performing the comparison at block 612 is discussed above in connection with FIG. 2. For example, at block 612 the example scene recognizer 252 may compare the image signature (e.g., image histogram) for the current scene with the image signatures (e.g., image histograms) for the reference scenes. A signature match may be declared if the current scene's signature has a certain degree of similarity with a reference scene's signature as specified by one or more thresholds. Control then proceeds to block 614 of FIG. 6B.

If the example scene recognizer 252 determines that the image signature of the current scene does not match any reference (e.g., previously learned and/or known) scene's signature (block 614), the scene is classified as a new scene (block 626). The example scene recognizer 252 then stops (e.g., pauses) the media stream 160 and passes the scene along with the scene classification information to the example GUI 152 to enable identification of the scene and any brand identifier(s) (e.g., logos) included in the scene (block 627). Example machine readable instructions 700 that may be executed to perform the identification procedure at block 627 are illustrated in FIGS. 7A-7C and discussed in greater detail below. After any identification via the GUI 152 is performed at block 627, the example scene recognizer 252 restarts the media stream 160 and control proceeds to block 610 of FIG. 6A at which the example scene recognizer 252 invokes the report generator 256 to report brand exposure based on the identification of the current scene and/or brand identifier(s) included therein obtained at block 627. Control then returns to block 630 to determine whether there are more scenes remaining in the media stream 160.

Returning to block 614 of FIG. 6B, if the image signature of the current scene matches an image signature corresponding to a reference (e.g., previously learned and/or known) scene, a record of stored information associated with the matched reference scene is retrieved (block 616). If the matched reference scene was marked and/or was otherwise determined to be a scene of no interest (block 618) (e.g., a scene known to not include brand identifiers), the current scene is classified as a scene of no interest (block 619). Control proceeds to block 610 of FIG. 6A at which the example scene recognizer 252 invokes the report generator 256 to report that the current scene has been classified as a scene of no interest. Control then returns to block 630 to determine whether there are more scenes remaining in the media stream 160.

However, if the reference scene was not marked or otherwise determined to be a scene of no interest (block 618), one or more regions of interest are then determined for the current scene (block 620). The region(s) of interest are determined based on stored region of interest information obtained at block 616 for the matched reference scene. The determined region(s) of interest in the scene is(are) then provided to the example brand recognizer 254 to enable comparison with one or more reference (e.g., previously learned and/or known) brand identifiers (block 621). Example machine readable instructions 800 that may be executed to perform the comparison procedure at block 621 are illustrated in FIG. 8A and discussed in greater detail below.

Based on the processing at block 621 performed by, for example, the example brand recognizer 254, if the example scene recognizer 252 determines that at least one region of interest does not match any reference (previously learned and/or known) brand identifiers (block 622), the scene is classified as a repeated scene of changed interest (block 628). A region of interest in a current scene may not match any reference brand identifier(s) associated with the matched reference scene if, for example, the region of interest includes brand identifier(s) (e.g., logos) that are animated, virtual and/or changing over time, etc. The example scene recognizer 252 then stops (e.g., pauses) the media stream 160 and provides the scene, the scene classification, and the region(s) of interest information to the example GUI 152 to enable identification of the scene and any brand identifier(s) included in the scene (block 629). Example machine readable instructions 700 that may be executed to perform the identification procedure at block 629 are illustrated in FIGS. 7A-7C and discussed in greater detail below. After any identification via the GUI 152 is performed at block 629, the example scene recognizer restarts the media stream 160 and control proceeds to block 610 of FIG. 6A at which the example scene recognizer 252 invokes the report generator 256 to report brand exposure based on the identification of the current scene and/or brand identifier(s) included therein obtained at block 629. Control then returns to block 630 to determine whether there are more scenes remaining in the media stream 160.

Returning to block 622, if all regions of interest in the scene match reference (e.g., previously learned and/or known) brand identifiers, the example scene recognizer 252 classifies the scene as a repeated scene of interest (block 624). The example scene recognizer 252 then provides the scene, the determined region(s) of interest and the detected/recognized brand identifier(s) to, for example, the example brand recognizer 254 to enable updating of brand identifier characteristics, and/or collection and/or calculation of brand exposure information related to the detected/recognized the brand identifier(s) (block 625). Example machine readable instructions 850 that may be executed to perform the processing at block 625 are illustrated in FIG. 8B and discussed in greater detail below. Next, control proceeds to block 610 of FIG. 6A at which the example scene recognizer 252 invokes the report generator 256 to report brand exposure based on the brand identifier(s) recognized/detected at block 625. Control then returns to block 630 to determine whether there are more scenes remaining in the media stream 160.

Turning to FIGS. 7A-7C, execution of the machine executable instructions 700 begins with the GUI 152 receiving a detected scene and a classification for the scene from, for example, the example scene recognizer 252 or via processing performed at block 627 and/or block 629 of FIG. 6B (block 701). The example GUI 152 then displays the scene via, for example, the output device 270 (block 702). The example GUI 152 then evaluates the scene classification received at block 701 (block 704). If the scene is classified as a new scene (block 706), the example GUI 152 then prompts the user 170 to indicate whether the current scene is a scene of interest (or, in other words, is not a scene of no interest) (block 708). In the illustrated example, the current scene will default to be a scene of no interest unless the user indicates otherwise. For example, at block 708 the GUI 152 may prompt the user 170 to enter identifying information, a command, click a button, etc., to indicate whether the scene is of interest or of no interest. Additionally or alternatively, the GUI 152 may automatically determine that the scene is of no interest if the user 170 does not begin to mark one or more regions of interest in the current scene within a predetermined interval of time after the scene is displayed. If the user 170 indicates that the scene is of no interest (e.g., by affirmative indication or by failing to enter any indication regarding the current scene) (block 710), the detected scene is reported to be a scene of no interest (block 712) and execution of the example machine accessible instructions 700 then ends. However, if the user 170 indicates that the scene is of interest (block 710), the user 170 may input a scene title for the current scene (block 714). The example GUI 152 then stores the scene title (along with the image signature) for the current scene in a database, (e.g., such as the learned knowledge database 264) (block 716). After processing at block 716 completes, or if the scene was not categorized as a new scene (block 706), control proceeds to block 718 of FIG. 7B.

Next, the example GUI 152 prompts the user 170 to click on a region of interest in the displayed scene (block 718). Once the user 170 has clicked on the region of interest, the example GUI 152 determines at which point the user 170 clicked and determines a small region around the point clicked (block 720). The example GUI 152 then calculates the region of interest and highlights the region of interest in the current scene being displayed via the output 270 (block 722). If the user 170 then clicks an area inside or outside of the highlighted displayed region of interest to resize and/or reshape the region of interest (block 724), the example GUI 152 re-calculates and displays the updated region of interest. Control returns to block 724 to allow the user 170 to continue re-sizing or re-shaping the highlighted, displayed region of interest. In another implementation, the region of interest creation technique of blocks 718-726 can be adapted to implement the example automated region of interest creation technique described above in connection with FIG. 10.

If the GUI 152 detects that the user 170 has not clicked an area inside or outside the highlighted region within a specified period of time (block 724), the example GUI 152 then compares the region of interest created by the user 170 with one or more reference (e.g., previously learned and/or known) brand identifiers (block 728). For example, at block 728 the example GUI 152 may provide the created region of interest and current scene's classification of, for example, a new scene or a repeated scene of changed interest to the example brand recognizer 254 to enable comparison with one or more reference (e.g., previously learned and/or known) brand identifiers. Additionally, if the scene is classified as a new scene, as opposed to a repeated scene of changed interest, the example brand recognizer 254 may relax the comparison parameters to return brand identifiers that are similar to, but that do not necessarily match, the created region of interest. Example machine readable instructions 800 that may be executed to perform the comparison procedure at block 728 are illustrated in FIG. 8A and discussed in greater detail below.

Next, after the brand identifier(s) is(are) compared at block 728, the example GUI 152 displays the closest matching reference (e.g., previously learned and/or known) brand identifier to the region of interest (block 730). The example GUI 152 then prompts the user to accept the displayed brand identifier or to input a new brand identifier for the created region of interest (block 732). Once the user has accepted the brand identifier displayed by the example GUI 152 and/or has input a new brand identifier, the example GUI 152 stores the description of the region of interest and the brand identifier in a database (e.g., such as the learned knowledge database 264) (block 734). For example, the description of the region of interest and/or brand identifier(s) contained therein may include, but is not limited to, information related to the size, shape, color, location, texture, duration of exposure, etc. Additionally or alternatively, the example GUI 152 may provide the information regarding the created region(s) of interest and the identified brand identifier(s) to, for example, the example brand recognizer 254 to enable reporting of the brand identifier(s). Example machine readable instructions 850 that may be executed to perform the processing at block 734 are illustrated in FIG. 8B and discussed in greater detail below.

Next, if the user 170 indicates that there are more regions of interest to be identified in the current scene (e.g., in response to a prompt) (block 736), control returns to block 718 at which the GUI 152 prompts the user to click on a new region of interest in the scene to begin identifying any brand identifier(s) included therein. However, if the user indicates that all regions of interest have been identified, control proceeds to block 737 of FIG. 7C at which a tracker function is initiated for each newly marked region of interest. As discussed above, a tracker function uses the marked region(s) of interest as a template(s) to track the corresponding region(s) of interest in the adjacent image frames comprising the current detected scene. After the processing at block 737 completes, the media stream 160 is restarted after having been stopped (e.g., paused) (block 738). The example GUI 152 then provides the scene and region(s) of interest to, for example, the example brand recognizer 254 to enable updating of brand identifier characteristics, and/or collection and/or calculation of brand exposure information related to the identified brand identifier(s) (block 740). Execution of the example machine accessible instructions 700 then ends.

Turning to FIG. 8A, execution of the example machine executable instructions 800 begins with a brand recognizer, such as the example brand recognizer 254, receiving a scene, the scene's classification and one or more regions of interest from, for example, the example scene recognizer 252, the example GUI 152, the processing at block 621 of FIG. 6B, and/or the processing at block 728 of FIG. 7C (block 801). The example brand recognizer 254 then obtains the next region of interest to be analyzed in the current scene from the information received at block 801 (block 802). The example brand recognizer 254 then compares the region of interest to one or more expected reference brand identifier templates (e.g., corresponding to a reference scene matching the current scene) having, for example, one or more expected locations, sizes, orientations, etc., to determine which reference brand identifier matches the region of interest (block 804). An example brand identifier matching technique based on template matching that may be used to implement the processing at block 804 is discussed above in connection with FIG. 4. Additionally, if the scene classification received at block 801 indicates that the scene is a new scene, the comparison parameters of the brand identifier matching technique employed at block 804 may be relaxed to return brand identifiers that are similar to, but that do not necessarily match, the compared region of interest.

Next, the example brand recognizer 254 returns the reference brand identifier matching (or which closely matches) the region of interest being examined (block 806). Then, if any region of interest has not been analyzed for brand exposure reporting (block 808), control returns to block 802 to process the next region of interest. If, however, all regions of interest have been analyzed (block 808), execution of the example machine accessible instructions 800 then ends.

Turning to FIG. 8B, execution of the example machine executable instructions 850 begins with a brand recognizer, such as the example brand recognizer 254, receiving information regarding one or more regions of interest and one or more respective brand identifiers detected therein from, for example, the example scene recognizer 252, the example GUI 152, the processing at block 625 of FIG. 6B, and/or the processing at block 734 of FIG. 7C (block 852). The example brand recognizer 254 then obtains the next detected brand identifier to be processed from the one or more detected brand identifiers received at block 852 (block 854). Next, one or more databases (e.g., the learned knowledge database 264 FIG. 2, the brand library 266 of FIG. 2, etc.) are queried for information regarding the detected brand identifier (block 856). The brand identifier data may include, but is not limited to, internal identifiers, names of entities (e.g., corporations, individuals, etc.) owning the brands associated with the brand identifiers, brand names, product names, service names, etc.

Next, characteristics of a brand identifier detected in the region of interest in the scene are obtained from the information received at block 852 (block 858). Next, the example brand recognizer 254 obtains the characteristics of the reference brand identifier corresponding to the detected brand identifier and compares the detected brand identifier's characteristics with the reference brand identifier's characteristics (block 860). The characteristics of the brand identifier may include, but are not limited to, location, size, texture, color, quality, duration of exposure, etc. The comparison at block 860 allows the example brand recognizer 254 to detect and/or report changes in the characteristics of brand identifiers over time. After the processing at block 860 completes, the identification information retrieved at block 856 for the detected brand identifier, the detected brand identifier's characteristics determined at block 858 and/or the changes in the brand identifier detected at block 860 are stored in one or more databases (e.g., such as the brand exposure database 155 of FIG. 1) for reporting and/or further analysis (block 812). Then, if any region of interest has not yet been analyzed for brand exposure reporting (block 814), control returns to block 854 to process the next region of interest. If all regions of interest have been analyzed, execution of the example machine accessible instructions 850 then ends.

Figure 9:
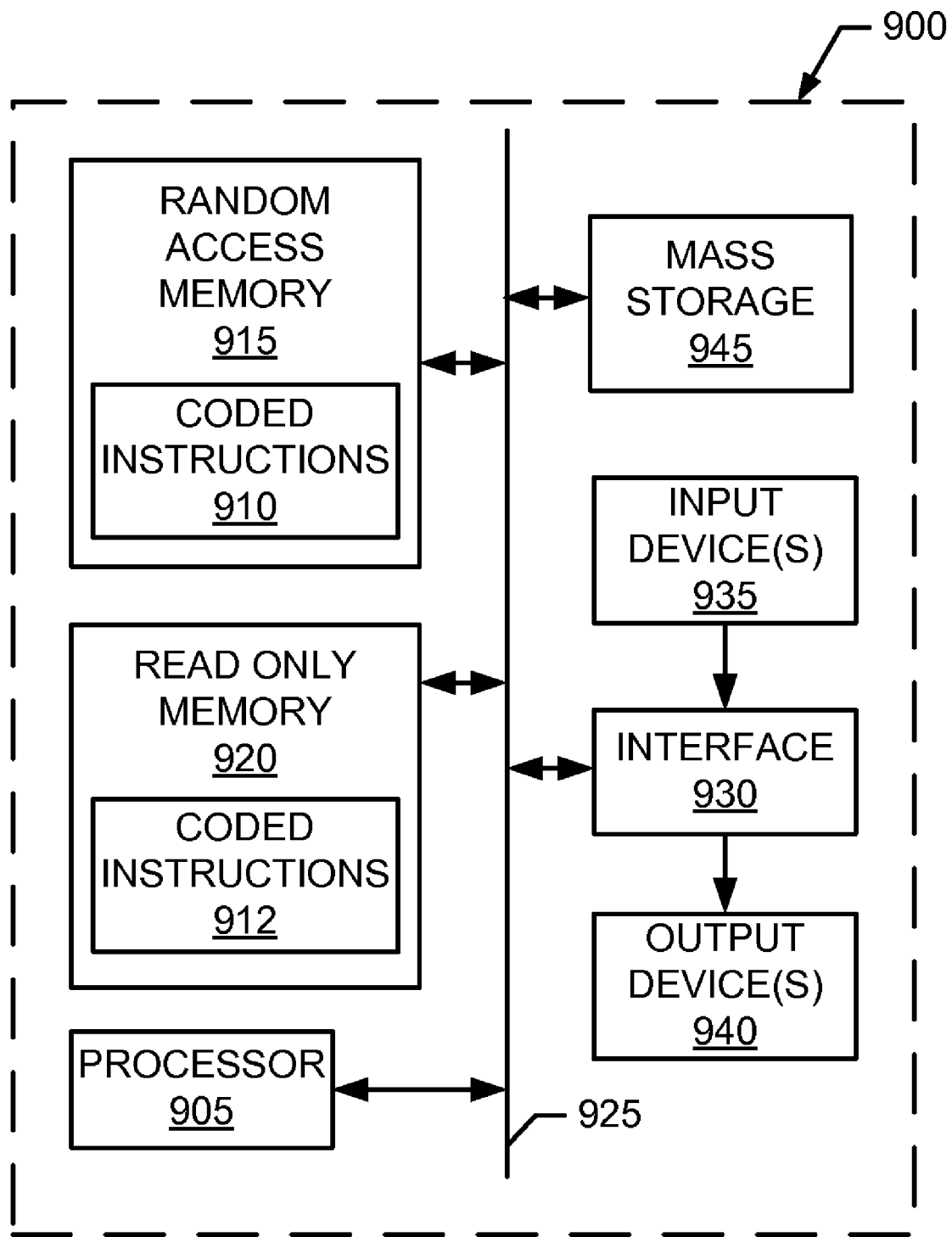
FIG. 9 is a schematic illustration of an example processor platform that may be used to execute some or all of the machine accessible instructions of FIGS. 6A-6B, 7A-7C and/or 8A-8B to implement the methods and apparatus described herein.

FIG. 9 is a schematic diagram of an example processor platform 900 capable of implementing the apparatus and methods disclosed herein. The example processor platform 900 can be, for example, a server, a personal computer, a personal digital assistant (PDA), an Internet appliance, a DVD player, a CD player, a digital video recorder, a personal video recorder, a set top box, or any other type of computing device.

The processor platform 900 of the example of FIG. 9 includes at least one general purpose programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIGS. 6A-6B, 7A-7C, and/or 8A-8B to implement any, all or at least portions of the example brand exposure monitor 150, the example GUI 152, the example scene recognizer 252, the example brand recognizer 254, etc.

The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown). The RAM 915 and/or any other storage device(s) included in the example processor platform 900 may be used to store and/or implement, for example, the example brand exposure database 155, the example scene database 262, the example learned knowledge database 264 and/or the example brand library 266.

The processor platform 900 also includes an interface circuit 930. The interface circuit 930 may be implemented by any type of interface standard, such as a USB interface, a Bluetooth interface, an external memory interface, serial port, general purpose input/output, etc. One or more input devices 935 and one or more output devices 940 are connected to the interface circuit 930. For example, the interface circuit 930 may be coupled to an appropriate input device 935 to receive the example media stream 160. Additionally or alternatively, the interface circuit 930 may be coupled to an appropriate output device 940 to implement the output device 270 and/or the GUI 152.

The processor platform 900 also includes one or more mass storage devices 945 for storing software and data. Examples of such mass storage devices 945 include floppy disk drives, hard drive disks, compact disk drives and digital versatile disk (DVD) drives. The mass storage device 945 may implement for example, the example brand exposure database 155, the example scene database 262, the example learned knowledge database 264 and/or the example brand library 266.

As an alternative to implementing the methods and/or apparatus described herein in a system such as the device of FIG. 9, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to specify a region of interest in a graphical presentation, the method comprising:
   determining an initial template region to represent the region of interest, a location of the initial template region based on a first point selected in the graphical presentation by a user;
   determining a first modification to perform on the initial template region in response to a second point selected in the graphical presentation by the user, the first modification at least one of selected by the user or corresponding to a default modification;
   detecting the second selected point in the graphical presentation, the second selected point at least one of outside or inside the initial template region, but not substantially on a boundary defining the initial template region; and
   reshaping the initial template region toward the second selected point, the reshaping corresponding to the first modification, the reshaping being performed in response to detecting the second selected point without also requiring the user to select any point substantially on the boundary defining the initial template region to initiate the reshaping.

2. A method as defined in claim 1 wherein determining the initial template region to represent the region of interest comprises:
   determining a set of pixels in the graphical presentation that are connected to a starting pixel by adjacent pixels that are similar to the starting pixel, wherein the starting pixel corresponds to the first selected point within the region of interest; and
   determining the initial template region to be at least one or a polygon or an ellipse bounding the set of pixels determined to be connected to the starting pixel.

3. A method as defined in claim 2 wherein two pixels are similar when the two pixels have at least one of substantially similar luminance values or substantially similar chrominance values.

4. A method as defined in claim 2 wherein the set of pixels is a second set of pixels, and determining the second set of pixels in the graphical presentation that are connected to the starting pixel comprises:
   identifying a first set of pixels adjacent to the starting pixel of the graphical presentation and comparing the first set of adjacent pixels to the starting pixel to determine whether each one of the first set of adjacent pixels is similar to the starting pixel; and
   recursively comparing adjacent pixels beginning with each one of the first set of adjacent pixels determined to be similar to the starting pixel to determine whether the adjacent pixels are similar, wherein the recursion ends when no more adjacent pixels are determined to be similar, and wherein the second set includes all pixels determined recursively to be similar to the starting pixel.

5. A method as defined in claim 1 wherein the first modification comprises a GROW_TO_POINT modification, and reshaping the initial template region toward the second selected point comprises:
   expanding the boundary defining the initial template region uniformly to bound the second selected point when the second selected point is outside the initial template region; and
   shrinking the boundary defining the initial template region uniformly to bound the second selected point when the second selected point is inside the initial template region.

6. A method as defined in claim 1 wherein the first modification comprises a GROW_ONE_STEP modification, and reshaping the initial template region toward the second selected point comprises:
   expanding the boundary defining the initial template region uniformly by a unit step size when the second selected point is outside the initial template region; and
   shrinking the boundary defining the initial template region uniformly by the unit step size when the second selected point is inside the initial template region.

7. A method as defined in claim 1 wherein the first modification comprises a GROW_ONE_DIRECTIONAL_STEP modification, and reshaping the initial template region toward the second selected point comprises:
   expanding the boundary defining the initial template region in a first direction toward the second selected point and by a unit step size when the second selected point is outside the initial template region; and shrinking the boundary defining the initial template region in a second direction toward the second selected point and by the unit step size when the second selected point is inside the initial template region.

8. A method as defined in claim 1 wherein the determined first modification comprises a GROW_TO_POINT_DIRECTIONAL modification, and reshaping the initial template region toward the second selected point comprises:

expanding the boundary defining the initial template region in a first direction toward the second selected point when the second selected point is outside the initial template region; and shrinking the boundary defining the initial template region in a second direction toward the second selected point when the second selected point is inside the initial template region.

9. A method as defined in claim 1 further comprising returning a reshaped initial template region to a previous shape upon determining that a second modification selected by the user corresponds to an UNDO operation.

10. A method as defined in claim 1 wherein the region of interest is a first region of interest and the reshaped template region is a first reshaped template region, and further comprising:

determining a second reshaped template region to represent a second region of interest;

determining a third template region bounding the first reshaped template region representing the first region of interest and the second reshaped template region representing the second region of interest; and using the third template region to represent an overall region of interest.

11. A method as defined in claim 1 wherein the region of interest is a first region of interest and the reshaped template region is a first reshaped template region, and further comprising:

determining a second reshaped template region to represent a second region of interest;

determining a third template region by excluding at least a portion of the second reshaped template region from the first reshaped template region; and using the third reshaped template region to represent an overall region of interest.

12. A method as defined in claim 1 wherein the region of interest is a first region of interest and the initial template region is a first initial template region, and wherein determining the first initial template region used to represent the first region of interest comprises:

determining a second region of interest that most closely matches the set of reference points detecting as being selected by the user, the set of reference points selecting substantially on a boundary of the first region of interest, the second region of interest at least one of stored or previously created; and determining the first initial template region used to represent the first region of interest to be a second template region used to represent the determined second region of interest.

13. A tangible storage medium storing machine readable instructions which, when executed, cause a machine to at least:

determine an initial template region to represent a region of interest in a graphical presentation, a location of the initial template region based on a first point selected in the graphical presentation by a user;

determine a first modification from a set of modifications to perform on the initial template region in response to a second point selected in the graphical presentation by the user, the first modification at least one of selected by the user or corresponding to a default modification;

detect the second selected point in the graphical presentation, the second selected point at least one of outside or inside the initial template region, but not substantially on a boundary defining the initial template region; and reshape the initial template region toward the second selected point, the reshaping corresponding to the determined type of modification, the reshaping being performed in response to detecting the second selected point without also requiring the user to select any point substantially on the boundary defining the initial template region to initiate the reshaping.

14. A tangible storage medium as defined in claim 13 wherein the machine readable instructions, when executed, further cause the machine to determine the initial template region to represent the region of interest by:

determining a set of pixels in the graphical presentation that are connected to a starting pixel by adjacent pixels that are similar to the starting pixel, wherein the starting pixel corresponds to the first selected point within the region of interest, and wherein two pixels are similar when the two pixels have at least one of substantially similar luminance values or substantially similar chrominance values; and determining the initial template region to be at least one or a polygon or an ellipse bounding the set of pixels determined to be connected to the starting pixel.

15. A tangible storage medium as defined in claim 13 wherein the set of modifications comprises:

a GROW_TO_POINT modification which, to reshape the initial template region, causes the machine to expand the boundary defining the initial template region uniformly to bound the second selected point when the second selected point is outside the initial template region and to shrink the boundary defining the initial template region uniformly to bound the second selected point when the second selected point is inside the initial template region;

a GROW_ONE_STEP modification which, to reshape the initial template region, causes the machine to expand the boundary defining the initial template region uniformly by a unit step size when the second selected point is outside the initial template region and to shrink the boundary defining the initial template region uniformly by the unit step size when the second selected point is inside the initial template region;

a GROW_ONE_DIRECTIONAL_STEP modification which, to reshape the initial template region, causes the machine to expand the boundary defining the initial template region in a first direction toward the second selected point and by a unit step size when the second selected point is outside the initial template region and to shrink the boundary defining the initial template region in a second direction toward the second selected point and by the unit step size when the second selected point is inside the initial template region; and a GROW_TO_POINT_DIRECTIONAL modification which, to reshape the initial template region, causes the machine to expand the boundary defining the initial template region in a first direction toward the second selected point when the second selected point is outside the initial template region and to shrink the boundary defining the initial template region in a second direction toward the second selected point when the second selected point is inside the initial template region.

16. A system for marking a region of interest in a graphical presentation, the system comprising:
   an output device to display the graphical presentation to a user;
   an input device for manipulation by the user to select points within the displayed graphical presentation; and
   a graphical user interface (GUI) processing element to:
      determine an initial template region to represent the region of interest in the graphical presentation, a location of the initial template region based on a first point selected in the graphical presentation by the user;
      determine a first modification from a set of modifications to perform on the initial template region in response to a second point selected in the graphical presentation by the user, the first modification at least one of selected by the user or corresponding to a default modification;
      detect the second selected point in the graphical presentation, the second selected point at least one of outside or inside the initial template region, but not substantially on a boundary defining the initial template region; and
      reshape the initial template region toward the second selected point, the reshaping corresponding to the determined type of modification, the reshaping being performed in response to detecting the second selected point without also requiring the user to select any point substantially on the boundary defining the initial template region to initiate the reshaping.

17. A system as defined in claim 16 wherein the GUI processing element is to cause the initial and reshaped template regions to be overlaid on the graphical presentation displayed by the output device.

18. A system as defined in claim 16 wherein the GUI processing element is further to determine the initial template region to represent the region of interest by:
   determining a set of pixels in the graphical presentation that are connected to a starting pixel by adjacent pixels that are similar to the starting pixel, wherein the starting pixel corresponds to the first selected point within the region of interest, and wherein two pixels are similar when the two pixels have at least one of substantially similar luminance values or substantially similar chrominance values; and
   determining the initial template region to be at least one or a polygon or an ellipse bounding the set of pixels determined to be connected to the starting pixel.

19. A system as defined in claim 16 wherein the set of modifications comprises:
   a GROW_TO_POINT modification which, to reshape the initial template region, causes the GUI processing element to expand the boundary defining the initial template region uniformly to bound the second selected point when the second selected point is outside the initial template region and to shrink the boundary defining the initial template region uniformly to bound the second selected point when the second selected point is inside the initial template region;
   a GROW_ONE_STEP modification which, to reshape the initial template region, causes the GUI processing element to expand the boundary defining the initial template region uniformly by a unit step size when the second selected point is outside the initial template region and to shrink the boundary defining the initial template region uniformly by the unit step size when the second selected point is inside the initial template region;
   a GROW_ONE_DIRECTIONAL_STEP modification which, to reshape the initial template region, causes the GUI processing element to expand the boundary defining the initial template region in a first direction toward the second selected point and by a unit step size when the second selected point is outside the initial template region and to shrink the boundary defining the initial template region in a second direction toward the second selected point and by the unit step size when the second selected point is inside the initial template region; and
   a GROW_TO_POINT_DIRECTIONAL modification which, to reshape the initial template region, causes the GUI processing element to expand the boundary defining the initial template region in a first direction toward the second selected point when the second selected point is outside the initial template region and to shrink the boundary defining the initial template region in a second direction toward the second selected point when the second selected point is inside the initial template region.

20. A system as defined in claim 16 wherein the region of interest is a first region of interest and the reshaped template region is a first reshaped template region, and wherein the GUI processing element is further to:
   determine a second reshaped template region to represent a second region of interest, the second reshaped template region determined by reshaping a second initial template region toward a third selected point, the reshaping corresponding to one of the set of modifications, the reshaping being performed in response to detecting the third selected point at least one of outside or inside the second initial template region without also requiring the user to select any point substantially on a boundary defining the second initial template region to initiate the reshaping; and
   determining a third template region by excluding at least a portion of the second reshaped template region from the first reshaped template region; and
   using the third reshaped template region to represent an overall region of interest.

* * * * *